United States Patent
Fu et al.

(10) Patent No.: US 9,556,044 B2
(45) Date of Patent: Jan. 31, 2017

(54) ELECTRODESALINATION SYSTEM AND METHOD

(71) Applicant: EVOQUA WATER TECHNOLOGIES PTE. LTD., Singapore (SG)

(72) Inventors: Rongqiang Fu, Singapore (SG); Kee Hoe Ng, Singapore (SG); Joseph D. Gifford, Marlborough, MA (US); George Y. Gu, Andover, MA (US); Li-Shiang Liang, Harvard, MA (US); Michael J. Shaw, Derry, NH (US)

(*) Notice: Subject to any disclaimer, the term of this patent is extended or adjusted under 35 U.S.C. 154(b) by 0 days.

(21) Appl. No.: 14/754,990

(22) Filed: Jun. 30, 2015

(65) Prior Publication Data

US 2015/0299003 A1    Oct. 22, 2015

Related U.S. Application Data

(62) Division of application No. 14/127,662, filed as application No. PCT/US2012/044937 on Jun. 29, 2012, now abandoned.

(60) Provisional application No. 61/503,850, filed on Jul. 1, 2011.

(51) Int. Cl.
| | | |
|---|---|---|
| C02F 1/469 | (2006.01) | |
| C02F 1/00 | (2006.01) | |
| B01D 61/42 | (2006.01) | |
| B01D 61/44 | (2006.01) | |
| B01D 61/54 | (2006.01) | |
| B01D 61/58 | (2006.01) | |
| C02F 103/08 | (2006.01) | |
| C02F 101/10 | (2006.01) | |

(52) U.S. Cl.
CPC .......... *C02F 1/4695* (2013.01); *B01D 61/422* (2013.01); *B01D 61/44* (2013.01); *B01D 61/54* (2013.01); *B01D 61/58* (2013.01); *C02F 1/008* (2013.01); *C02F 1/4691* (2013.01); *C02F 1/4693* (2013.01); *B01D 2317/02* (2013.01); *C02F 2101/10* (2013.01); *C02F 2103/08* (2013.01); *C02F 2201/46* (2013.01); *C02F 2201/4611* (2013.01); *C02F 2201/4612* (2013.01); *C02F 2201/4618* (2013.01); *C02F 2201/46135* (2013.01); *C02F 2209/005* (2013.01); *C02F 2209/05* (2013.01); *C02F 2209/06* (2013.01); *Y02W 10/33* (2015.05); *Y02W 10/37* (2015.05)

(58) Field of Classification Search
CPC ..... C01F 1/4693; C01F 1/4691; C01F 1/4695; C01F 2209/40
See application file for complete search history.

(56) References Cited

U.S. PATENT DOCUMENTS

| | | |
|---|---|---|
| 3,014,855 A | 12/1961 | Kressman |
| 3,405,047 A | 10/1968 | Chen |
| 4,536,269 A | 8/1985 | Chlanda et al. |
| 5,503,729 A | 4/1996 | Elyanow et al. |
| 5,814,197 A | 9/1998 | Batchelder et al. |
| 6,764,584 B2 | 7/2004 | Chang et al. |
| 2003/0183575 A1 | 10/2003 | Zeiher et al. |
| 2005/0103631 A1 | 5/2005 | Freydina et al. |
| 2005/0103724 A1 | 5/2005 | Wilkins et al. |
| 2007/0215474 A1 | 9/2007 | Batchelder et al. |
| 2010/0282689 A1 | 11/2010 | Ganzi et al. |

*Primary Examiner* — Steven A. Friday

(57) ABSTRACT

Systems and methods for the desalination of seawater or brackish water for the purpose of obtaining potable water. Systems may include a combination of electrodialysis and electrodeionization modules. The system configuration and process controls may achieve low energy consumption and stable operation.

6 Claims, 18 Drawing Sheets

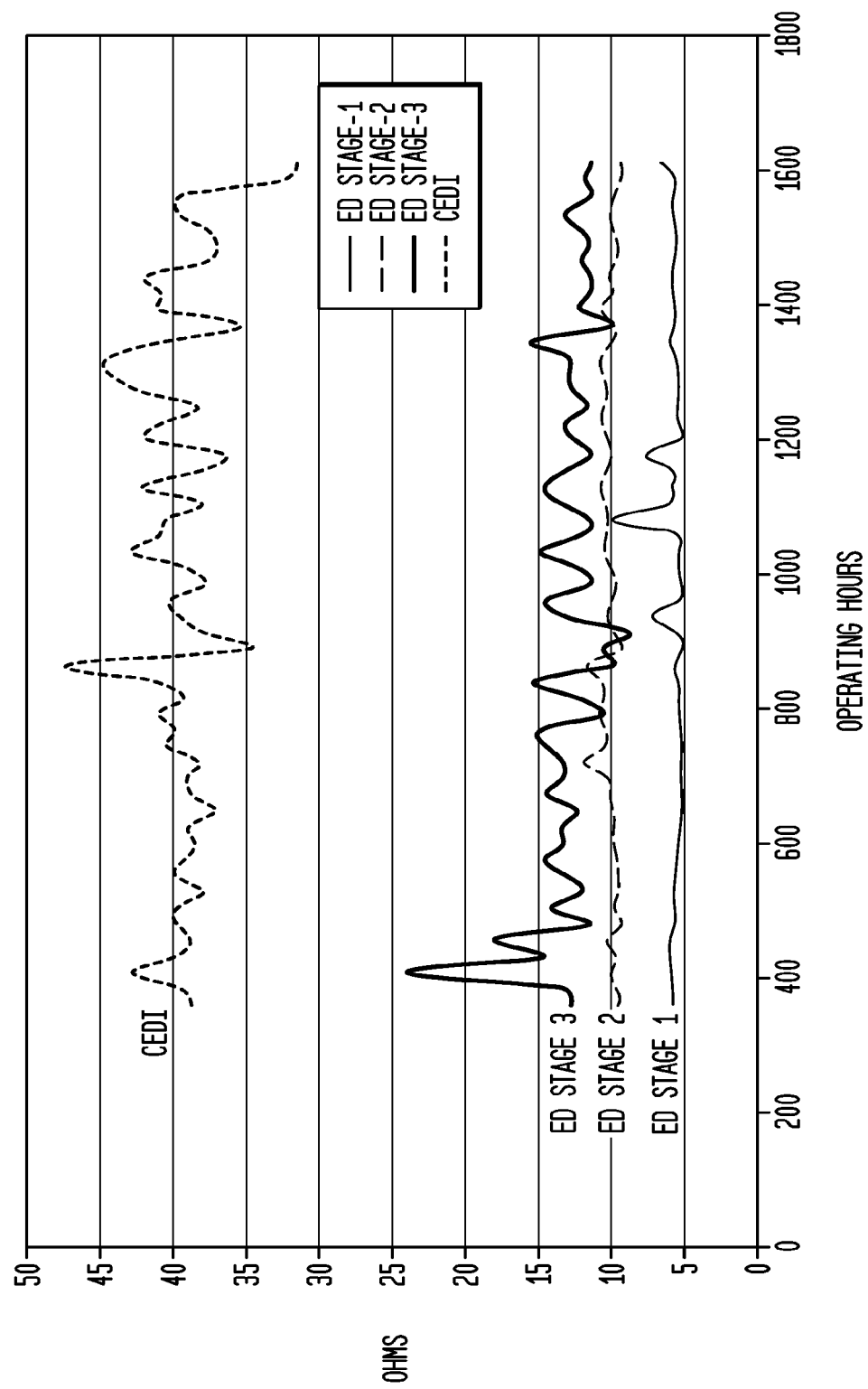

VOLTAGE DROP, NaCl SOLUTION
ED-0.51 mm SPACER THICKNESS
CEDI-1.65 mm SPACER THICKNESS

ELECTRODESALINATION SYSTEM AND METHOD

CROSS-REFERENCE TO RELATED APPLICATION APPLICATIONS

This application is a divisional application of U.S. patent application Ser. No. 14/127,662, filed Mar. 12, 2014, titled "ELECTRODESALINATION SYSTEM AND METHOD," which is a U.S. National Stage Application under 35 U.S.C. §371 of International PCT Application Serial No. PCT/US2012/044937 filed on Jun. 29, 2012, titled "ELECTRODESALINATION SYSTEM AND METHOD," which in turn claims priority under 35 U.S.C. §119(e) to U.S. Provisional Patent Application Ser. No. 61/503,850, filed on Jul. 1, 2011, titled "ELECTRODESALINATION SYSTEM AND METHOD" the entire disclosures of which are hereby incorporated herein by reference in their entireties for all purposes.

FIELD OF THE DISCLOSURE

Aspects relate generally to electrochemical separation and, more particularly, to electrochemical systems and methods for desalination.

SUMMARY

Aspects relate generally to electrodesalination systems and methods for reduced energy consumption.

In accordance with one or more aspects, a desalination system may comprise an electrodialysis (ED) device, an electrodeionization (EDI) device fluidly connected downstream of the ED device, and a controller configured to determine an optimum transition point between the ED and EDI devices with respect to power consumption and salt removal, and further configured to bring the EDI device online when a product stream of the ED device achieves the optimum transition point.

In accordance with one or more aspects, a method of providing potable water may comprise fluidly connecting a seawater feed stream to an inlet of an electrical purification system, the system comprising at least a first stage and a second stage downstream of the first stage, recovering water from the first stage at a first rate, recovering water from the second stage at a second rate that is less than the first rate, and fluidly connecting an outlet of the electrical purification system to a potable point of use.

In accordance with one or more aspects, a method of providing potable water may comprise fluidly connecting a seawater feed stream to an inlet of an electrical purification system, the system comprising at least a first electrodialysis (ED) stage and a second ED stage downstream of the first ED stage, inhibiting concentration polarization by passing a process stream through a dilute compartment in the second ED stage at an increased velocity relative to the first ED stage, and delivering potable water to a point of use downstream of the electrical purification system.

In accordance with one or more aspects, a desalination system may comprise an electrical purification system comprising at least a first electrodialysis (ED) stage and a second ED stage fluidly connected downstream of the first ED stage, at least one conductivity sensor associated with the electrical purification system, and a controller configured to apply a first voltage to the first ED stage and to apply a second voltage, lower than the first voltage, to the second ED stage based on input from the conductivity sensor to inhibit concentration polarization.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

FIGS. 6A-6D present data discussed in accompanying Example 2 in accordance with one or more embodiments;

DETAILED DESCRIPTION

Figure 1:
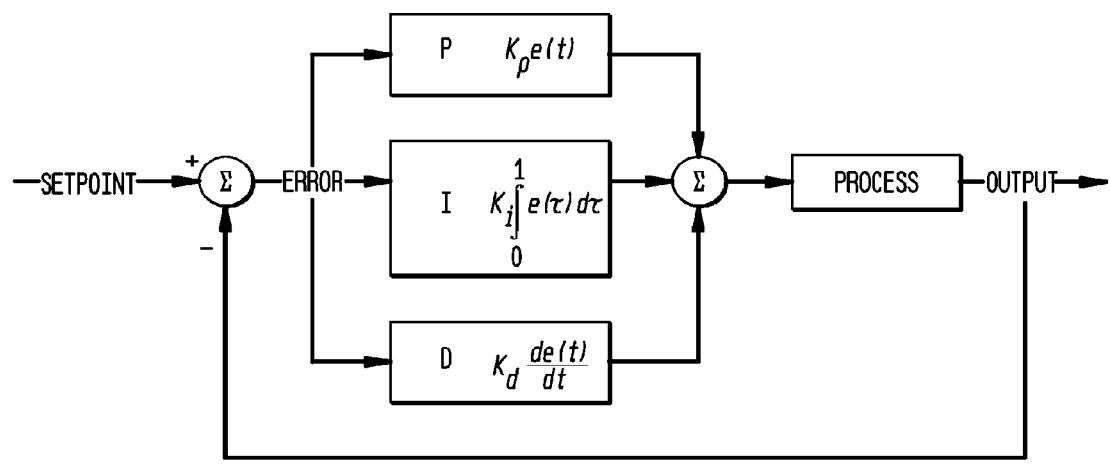
FIGS. 1-2 present PID control schematics in accordance with one or more embodiments.

Devices for purifying fluids with electrical fields are commonly used to treat water and other liquids containing dissolved ionic species. Two types of devices that treat water in this way are electrodeionization and electrodialysis devices. Within these devices are concentrating and diluting compartments separated by ion-selective membranes. An electrodialysis device typically includes alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semi-permeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In both CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

Plate-and-frame and spiral wound designs have been used for various types of electrochemical deionization devices including but not limited to ED and EDI devices. Commercially available ED devices are typically of plate-and-frame design, while EDI devices are available in both plate and frame and spiral configurations. Various embodiments are applicable to plate- and frame, spiral wound, and cross-flow designs as discussed herein.

One or more embodiments relate to devices that may purify fluids electrically that may be contained within a housing, as well as methods of manufacture and use thereof. Liquids or other fluids to be purified enter the purification device or apparatus and, under the influence of an electric field, are treated to produce an ion-depleted liquid. Species from the entering liquids are collected to produce an ion-concentrated liquid. The components of the electrical purification apparatus, which may also be referred to as an electrochemical separation system or an electrochemical separation device, may be assembled using various techniques to achieve optimal operation of the apparatus.

The power consumption of sea water desalination processes has been a long standing barrier to wide spread acceptance of using desalination for the production of potable water. The typical power consumption can range from about 3.5 kwh/m³ for a pressure driven process such as reverse osmosis to more than 10 kwh/m³ for a thermal desalination process.

The use of electrically driven electrochemical deionization processes such as electrodialysis and electrodeionization has traditionally been limited to purifying water with less ionic content than sea water. However, a power consumption of about 1.8 kwh/m³ may be achieved when using a combination of electrochemical separation devices in accordance with one or more embodiments. In accordance with certain embodiments, potable water may be produced from seawater at an energy value of about 1.5 kWh/m³ or less.

As used herein, "purify" relates to reducing the total dissolved solids content and optionally to reducing the concentration of suspended solids, colloidal content and ionized and non-ionized impurities in a source water to a level where the purified water has been rendered potable and can be used for fresh water purposes such as, but not limited to, human and animal consumption, irrigation, and industrial applications. Desalination is a type of purification in which salt is removed from seawater. One or more embodiments may pertain to desalination of seawater. The feed water or water to be treated may be from a variety of sources including those having a TDS content of between about 3,000 ppm and about 40,000 ppm, or more. Feed water can be, for example, seawater from the ocean, brackish water, gray water, industrial effluent, and oil fill recovery water. The feed water may contain high levels of monovalent salts, divalent and multivalent salts, and organic species. In some embodiments, notable aspects may involve methods of treating or desalinating a process water or a feed water consisting of or consisting essentially of seawater. The water may be processed to a desired or required level of purity.

In accordance with one or more embodiments, the process stream may generally comprise a water stream deliverable to the electrochemical device for treatment. In some embodiments, the process stream may generally comprise a salt solution. A salt solution may contain a single salt species or a mixture of salt species, for example, as may be present in seawater. In at least one embodiment, the process stream may comprise non-potable water. Potable water typically has a total dissolved solids (TDS) content of less than about 1,500 ppm. In some embodiments, potable water may have a TDS of less than about 1,000 ppm. In some cases, potable water may have a TDS content of less than about 500 ppm. In some non-limiting embodiments, potable water may have a TDS content of less than about 250 ppm. Examples of non-potable water may include seawater or salt water, brackish water, gray water, and some industrial water. A process stream may include target species such as chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver and zinc. In accordance with one or more embodiments, the invention is directed to a method of treating seawater or brackish water where the source water comprises a solute mixture. In some embodiments, monovalent ions may be at a higher concentration as compared to the concentrations of divalent and other multivalent ions. References to seawater herein are generally applicable to other forms of non-potable water.

In some embodiments of the disclosure, a method of providing a source of potable water is provided. In certain embodiments, a method of facilitating the production of potable water from seawater is provided. The method may comprise providing an electrical purification apparatus comprising a cell stack. The method may further comprise fluidly connecting a seawater feed stream to an inlet of the electrical purification apparatus. The method may further comprise fluidly connecting an outlet of the electrical purification apparatus to a potable point of use. Seawater or estuary water may have a concentration of total dissolved solids in a range of about 10,000 to about 45,000 ppm. In certain examples, the seawater or estuary water may have a concentration of total dissolved solids of about 35,000 ppm.

Other types of feed water comprising different concentrations of total dissolved solids may be treated or processed using the apparatus and methods of the present disclosure. For example, brackish water, having a total dissolved solids content in a range of about 1000 ppm to about 10,000 ppm may be treated to produce potable water. Brine, having a total dissolved solids content in a range of about 50,000 ppm to about 150,000 ppm may be treated to produce potable water. In some embodiments, brine, having a total dissolved solids content in a range of about 50,000 ppm to about 150,000 ppm may be treated to produce a water having a lower total dissolved solids content for purposes of disposal, for example, to a body of water, such as an ocean.

In accordance with one or more embodiments, an electrodialysis module includes cation exchange and anion exchange membranes separated by a spacer comprising a screen and gasket, for example. Numerous repeating pairs of this combination are used to make an electrodialysis module. In some non-limiting embodiments, there may be about 100 to 1000 repeating pairs or cell pairs in a module. Each cell pair may include a dilute compartment and a concentrate compartment. As water is passed through the cell pairs, an electric field generated by a direct current (DC) power supply may be imposed perpendicular to the water flow. This may result in the migration of ions from the dilute compartment to the concentrate compartment through the ion exchange membranes. In desalination operations, salt ions may be transferred through ion exchange membranes. Cations will transfer through the cation membrane and anions will transfer through the anion membrane. Water from the cell pairs may be combined in manifolds within the electrodialysis module. Two water streams may exit the module, a dilute stream and a concentrate stream. Electrodeionization may also use cation exchange and anion exchange membranes separated by a spacer with a void volume filled with an ion exchange material such as ion exchange beads, felts and the like. In some embodiments, an electrodeionization device may include an ion exchange screen. In accordance with one or more embodiments, an ion exchange screen may be a functionalized screen, such as a screen having cation and/or anion functionality. The use of ion exchange material in place of an inert screen may improve the ability of the electrodeionization device to remove ions from water when the water is dilute, for example, less than about 5000 mg/l of ionic concentration. The ion exchange material can comprise either cation exchange or anion exchange material and combinations thereof.

In accordance with one or more embodiments, an electrochemical separation system or device may be modular. Each modular unit may generally function as a sub-block of an overall electrochemical separation system. A modular unit may include any desired number of cell pairs. In some embodiments, the number of cell pairs per modular unit may depend on the total number of cell pairs and passes in the separation device. It may also depend on the number of cell pairs that can be thermally bonded and potted in a frame with an acceptable failure rate when tested for cross-leaks and other performance criteria. The number can be based on statistical analysis of the manufacturing process and can be increased as process controls improve. In some non-limiting embodiments, a modular unit may include about 50 cell pairs. Modular units may be individually assembled and quality control tested, such as for leakage, separation performance and pressure drop prior to being incorporated into a larger system. In some embodiments, a cell stack may be mounted in a frame as a modular unit that can be tested independently. A plurality of modular units can then be assembled together to provide an overall intended number of cell pairs in an electrochemical separation device. In some embodiments, an assembly method may generally involve placing a first modular unit on a second modular unit, placing a third modular unit on the first and second modular units, and repeating to obtain a plurality of modular units of a desired number. In some embodiments, the assembly or individual modular units may be inserted into a pressure vessel for operation. Multi-pass flow configurations may be possible with the placement of blocking membranes and/or spacers between modular units or within modular units. A modular approach may improve manufacturability in terms of time and cost savings. Modularity may also facilitate system maintenance by allowing for the diagnosis, isolation, removal and replacement of individual modular units. Individual modular units may include manifolding and flow distribution systems to facilitate an electrochemical separation process. Individual modular units may be in fluid communication with one another, as well as with central manifolding and other systems associated with an overall electrochemical separation process.

In accordance with one or more embodiments, the efficiency of electrochemical separation systems may be improved. Current loss is one potential source of inefficiency. In some embodiments, such as those involving a cross-flow design, the potential for current leakage may be addressed. Current efficiency may be defined as the percentage of current that is effective in moving ions out of the dilute stream into the concentrate stream. Various sources of current inefficiency may exist in an electrochemical separation system. One potential source of inefficiency may involve current that bypasses the cell pairs by flowing through the dilute and concentrate inlet and outlet manifolds. Open inlet and outlet manifolds may be in direct fluid communication with flow compartments and may reduce pressure drop in each flow path. Part of the electrical current from one electrode to the other may bypass the stack of cell pairs by flowing through the open areas. The bypass current reduces current efficiency and increases energy consumption. Another potential source of inefficiency may involve ions that enter the dilute stream from the concentrate due to imperfect permselectivity of ion exchange membranes. In some embodiments, techniques associated with the sealing and potting of membranes and screens within a device may facilitate reduction of current leakage.

In one or more embodiments, a bypass path through a stack may be manipulated to promote current flow along a direct path through a cell stack so as to improve current efficiency. In some embodiments, an electrochemical separation device may be constructed and arranged such that one or more bypass paths are more tortuous than a direct path through the cell stack. In at least certain embodiments, an electrochemical separation device may be constructed and arranged such that one or more bypass paths present higher resistance than a direct path through the cell stack. In some embodiments involving a modular system, individual modular units may be configured to promote current efficiency. Modular units may be constructed and arranged to provide a current bypass path that will contribute to current efficiency. In non-limiting embodiments, a modular unit may include a manifold system and/or a flow distribution system configured to promote current efficiency. In at least some embodiments, a frame surrounding a cell stack in an electrochemical separation modular unit may be constructed and arranged to provide a predetermined current bypass path. In some embodiments, promoting a multi-pass flow configuration within an electrochemical separation device may facilitate reduction of current leakage. In at least some non-limiting embodiments, blocking membranes or spacers may be inserted between modular units to direct dilute and/or concentrate streams into multiple-pass flow configurations for improved current efficiency. In some embodiments, current efficiency of at least about 60% may be achieved. In other embodiments, a current efficiency of at least about 70% may be achieved. In still other embodiments, a current efficiency of at least about 80% may be achieved. In at least some embodiments, a current efficiency of at least about 85% may be achieved.

In accordance with one or more embodiments, a method for preparing a cell stack for an electrical purification apparatus may comprise forming compartments. A first compartment may be formed by securing ion exchange membranes to one another to provide a first spacer assembly having a first spacer disposed between the ion exchange membranes. For example, a first cation exchange membrane may be secured to a first anion exchange membrane at a first portion of a periphery of the first cation exchange membrane and the first anion exchange membrane to provide a first spacer assembly having a first spacer disposed between the first cation exchange membrane and the first anion exchange membrane.

A second compartment may be formed by securing ion exchange membranes to one another to provide a second spacer assembly having a second spacer disposed between the ion exchange membranes. For example, a second anion exchange membrane may be secured to a second cation exchange membrane at a first portion of a periphery of the second cation exchange membrane and the second anion exchange membrane to provide a second spacer assembly having a second spacer disposed between the second anion exchange membrane and the second cation exchange membrane.

A third compartment may be formed between the first compartment and the second compartment by securing the first spacer assembly to the second spacer assembly, and by positioning a spacer therebetween. For example, the first spacer assembly may be secured to the second spacer assembly at a second portion of the periphery of the first cation exchange membrane and at a portion of the periphery of the second anion exchange membrane to provide a stack assembly having a spacer disposed between the first spacer assembly and the second spacer assembly.

In some non-limiting embodiments, each of the first compartment and the second compartment may be constructed and arranged to provide a direction of fluid flow that is different from the direction of fluid flow in the third compartment. For example, the fluid flow in the third compartment may be running in a direction of a 0° axis. The fluid flow in the first compartment may be running at 30°, and the fluid flow in the second compartment may be running at the same angle as the first compartment (30°) or at another angle, such as 120°. The method may further comprise securing the assembled cell stack within a housing.

In accordance with one or more embodiments, an electrochemical separation system may include a cross-flow design. A cross-flow design may allow for increased membrane utilization, lower pressure drop and a reduction in external leaks. Additionally, limitations on operating pressure may be reduced by a cross-flow design. In at least some embodiments, the pressure rating of a shell and endcaps may be the only substantial limitations on operating pressure. Automation of manufacturing processes may also be achieved.

In accordance with one or more embodiments, a first fluid flow path and a second fluid flow path may be selected and provided by way of the portions of the peripheries of the ion exchange membranes that are secured to one another. Using the first fluid flow path as a direction running along a 0° axis, the second fluid flow path may run in a direction of any angle greater than zero degrees and less than 360°. In certain embodiments of the disclosure, the second fluid flow path may run at a 90° angle, or perpendicular to the first fluid flow path. In other embodiments, the second fluid flow path may run at a 180° angle to the first fluid flow path. If additional ion exchange membranes are secured to the cell stack to provide additional compartments, the fluid flow paths in these additional compartments may be the same or different from the first fluid flow path and the second fluid flow path. In certain embodiments, the fluid flow path in each of the compartments alternates between a first fluid flow path and a second fluid flow path. For example, the first fluid flow path in the first compartment may be running in a direction of 0°. The second fluid flow path in the second compartment may be running in a direction of 90°, and the third fluid flow path in the third compartment may be running in a direction of 0°. In certain examples, this may be referred to as cross-flow electrical purification.

In other embodiments, the fluid flow path in each of the compartments alternates sequentially between a first fluid flow path, a second fluid flow path, and a third fluid flow path. For example, the first fluid flow path in the first compartment may be running in a direction of 0°. The second fluid flow path in the second compartment may be running at 30°, and the third fluid flow path in the third compartment may be running at 90°. The fourth fluid flow path in the fourth compartment may be running at 0°. In another embodiment, the first fluid flow path in the first compartment may be running in a direction of 0°. The second fluid flow path in the second compartment may be running at 60°, and the third fluid flow path in the third compartment may be running at 120°. The fourth fluid flow path in the fourth compartment may be running at 0°. In some embodiments, one or more flow paths may be substantially non-radial. In at least some embodiments, one or more flow paths may facilitate achieving a substantially uniform liquid flow velocity profile within the system.

In accordance with one or more embodiments, the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment, which will be discussed further below. In certain embodiments, the obstructions, projections, protrusions flanges, or baffles may be referred to as a flow redistributor. A flow redistributor may be present in one or more of the compartments of the cell stack.

In some embodiments, the plurality of ion exchange membranes secured to one another may alternate between cation exchange membranes and anion exchange membranes to provide a series of ion diluting compartments and ion concentrating compartments.

The geometry of the membranes may be of any suitable geometry such that the membranes may be secured within a cell stack. In certain embodiments, a particular number of corners or vertices on the cell stack may be desired so as to suitably secure the cell stack within a housing. In certain embodiments, particular membranes may have different geometries than other membranes in the cell stack. The geometries of the membranes may be selected to assist in at least one of securing the membranes to one another, to secure spacers within the cell stack, to secure membranes within a modular unit, to secure membranes within a support structure, to secure a group of membranes such as a cell stack to a housing, and to secure a modular unit into a housing.

In some embodiments of the disclosure, an electrical purification apparatus comprising a cell stack is provided. The electrical purification apparatus may comprise a first compartment comprising ion exchange membranes and may be constructed and arranged to provide a direct fluid flow in a first direction between the ion exchange membranes. The electrical purification apparatus may also comprise a second compartment comprising ion exchange membranes and may be constructed and arranged to provide a direct fluid flow in a second direction. Each of the first compartment and the second compartment may be constructed and arranged to provide a predetermined percentage of surface area or membrane utilization for fluid contact. In certain embodiments, the membrane utilization that may be achieved is greater than 65%. In other embodiments, the membrane utilization that may be achieved is greater than 75%. In certain other embodiments, the membrane utilization that may be achieved may be greater than 85%. The membrane utilization may be at least in part dependent on the methods used to secure each of the membranes to one another, and the design of the spacer. In order to obtain a predetermined membrane utilization, appropriate securing techniques and components may be selected in order to achieve a reliable and secure seal that allows optimal operation of the electrical purification apparatus, without encountering leakage within the apparatus, while maintaining a large surface area of membrane that may be used in the process.

For example an electrical purification apparatus comprising a cell stack may be provided. The electrical purification apparatus may comprise a first compartment comprising a first cation exchange membrane and a first anion exchange membrane, the first compartment constructed and arranged to provide a direct fluid flow in a first direction between the first cation exchange membrane and the first anion exchange membrane. The apparatus may also comprise a second compartment comprising the first anion exchange membrane and a second cation exchange membrane to provide a direct fluid flow in a second direction between the first anion exchange membrane and the second cation exchange membrane. Each of the first compartment and the second compartment may be constructed and arranged to provide a predetermined membrane utilization, for example, a fluid contact of greater than 85% of the surface area of the first cation exchange membrane, the first anion exchange membrane and the second cation exchange membrane. At least one of the first compartment and the second compartment may comprise a spacer, which may be a blocking spacer. The direct fluid flow in the first direction and the second direction may be selected and provided by the construction and arrangement of the compartments.

The electrical purification apparatus comprising a cell stack may further comprise a housing enclosing the cell stack, with at least a portion of a periphery of the cell stack secured to the housing. A frame may be positioned between the housing and the cell stack to provide first modular unit in the housing. A flow redistributor may be present in one or more of the compartments of the cell stack. At least one of the compartments may be constructed and arranged to provide flow reversal within the compartment.

In some embodiments of the disclosure, a cell stack for an electrical purification apparatus is provided. The cell stack may provide a plurality of alternating ion depleting and ion concentrating compartments. Each of the ion depleting compartments may have an inlet and an outlet that provides a dilute fluid flow in a first direction. Each of the ion concentrating compartments may have an inlet and an outlet that provides a concentrated fluid flow in a second direction that is different from the first direction. A spacer may be positioned in the cell stack. The spacer may provide structure to and define the compartments and, in certain examples, may assist in directing fluid flow through the compartment. The spacer may be a blocking spacer which may be constructed and arrange to redirect at least one of fluid flow and electrical current through the cell stack. As discussed, the blocking spacer may reduce or prevent electrical current inefficiencies in the electrical purification apparatus.

In some embodiments of the disclosure, an electrical purification apparatus is provided. The apparatus may comprise a cell stack comprising alternating ion diluting compartments and ion concentrating compartments. Each of the ion diluting compartments may be constructed and arranged to provide a fluid flow in a first direction. Each of the ion concentrating compartments may be constructed and arranged to provide a fluid flow in a second direction that is different from the first direction. The electrical purification apparatus may also comprise a first electrode adjacent an first ion exchange membrane at a first end of the cell stack, and a second electrode adjacent a second ion exchange membrane at a second end of the cell stack. Each of the first ion exchange membrane and the second ion exchange membrane may be an anion exchange membrane or a cation exchange membrane. For example, the first ion exchange membrane may be an anion exchange membrane, and the second ion exchange membrane may be a cation exchange membrane. The apparatus may further comprise a blocking spacer positioned in the cell stack and constructed and arranged to redirect at least one of a dilute fluid flow and a concentrate fluid flow through the electrical purification apparatus and to prevent a direct current path between the first electrode and the second electrode. As discussed above, the blocking spacer may be constructed and arranged to reduce electrical current inefficiencies in the electrical purification apparatus.

The cell stack for the electrical purification apparatus may be enclosed in a housing with at least a portion of a periphery of the cell stack secured to the housing. A frame may be positioned between the housing and the cell stack to provide first modular unit in the housing. A second modular unit may also be secured within the housing. A blocking spacer may also be positioned between the first modular unit and the second modular unit. A flow redistributor may be present in one or more of the compartments of the cell stack. At least one of the compartments may be constructed and arranged to provide flow reversal within the compartment. A bracket assembly may be positioned between the frame and the housing to provide support to the modular unit and to secure the modular unit within the housing. In certain embodiments of the disclosure, an electrical purification apparatus is provided that reduces or prevents inefficiencies resulting from greater electrical power consumption. The electrical purification apparatus of the present disclosure may provide for a multiple pass flow configuration to reduce or prevent current inefficiencies. The multiple pass flow configuration may reduce the bypass of current through the flow manifolds, or leakage of current, by eliminating or reducing the direct current path between the anode and the cathode of the electrical purification apparatus.

In certain embodiments of the disclosure the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment. The obstructions, projections, protrusions, flanges, or baffles may be formed as part of ion exchange membranes, the spacer, or may be an additional separate structure that is provided within the compartment. The obstructions, projections, protrusions, flanges, or baffles may be formed by providing an extension from an adhesive that may secure the ion exchange membranes to one another. The spacer may be impregnated with thermoplastic rubber to form protrusions that may be bonded with adhesive to adjacent membranes. The thermoplastic rubber may be applied to the spacer using processes such as thermo-compression or rotary screen printing. The compartments may or may not contain ion exchange resin.

In accordance with one or more embodiments, water is purified under the presence of an electric field via electrodialysis. Water in the dilute compartment becomes purer while the water in the adjacent concentrate compartment becomes enriched with ionic compounds. This may result in the electrical resistance of the module increasing since the dilute water is not very conductive. Furthermore, if the water in the dilute compartment becomes too pure, water will dissociate near the ion exchange membrane leading to a layer of very high electrical resistance water directly adjacent to the ion exchange membrane that increases the overall applied voltage. This inefficiency can limit the electrodialysis process to conditions where these phenomena will not occur. In order to minimize this effect also referred to as concentration polarization, various process modifications can be performed in accordance with one or more embodiments.

In some embodiments, fluid velocity within the dilute compartment may be adjusted to avoid concentration polarization. By increasing the flow velocity through each spacer, the boundary layer may be decreased near the membrane which may improve the mixing of water within the spacer and may therefore lessen the effects of concentration polarization. For example, an electrodialysis process may be performed with a lower velocity when the water has sufficient conductivity to avoid concentration polarization and a higher velocity as the water becomes more dilute. For instance, in a multi-stage process that includes several electrodialysis stages in series, the fluid velocity in later stages may be increased when the water is purer by using fewer numbers of cell pairs.

In addition, an electrodialysis module may be modified so that there are multiple passes through the electric field contained within a single module. In accordance with one or more embodiments, velocity can be increased in the same ED module by reducing the number of cell pairs per pass in the ED module. Multiple passes within one module may be referred to as a folded path module. As a non-limiting example, for a five pass folded path module in a single electrodialysis module, the number of cell pairs in each pass may be modified to include 182 cell pairs for the first pass, 164 cell pairs for the second pass, 148 cell pairs for the third pass, 130 cell pairs for the fourth pass and 120 cell pairs for the fifth and final pass. By changing the velocity, the boundary layer next to the ion exchange membranes may be modified resulting in lower concentration polarization effects which also reduces the electrical resistance of the module. Embodiments are not limited to the number of stages, the number of passes within a stage, the number of cell pairs in each stage or the flow path length of either the electrodialysis or electrodeionization module.

In accordance with one or more embodiments, velocity may be increased with decreasing concentration polarization or pass. Concentration polarization and limiting current density in an ED operation is generally governed by solution concentration, current density and velocity of diluting compartment. To prevent limiting current in ED operations for seawater, velocity of the dilute compartment may be increased in the later stages of the desalting process in accordance with one or more embodiments. Avoiding desalting at limiting current density may result in lower module resistance, (i.e. lower energy consumption), lower risk of scaling (i.e. reduced generation of OH ions), and improved current efficiency (i.e. reduced module resistance and reduced risk of electrical shorting or leakage).

Figure 2:
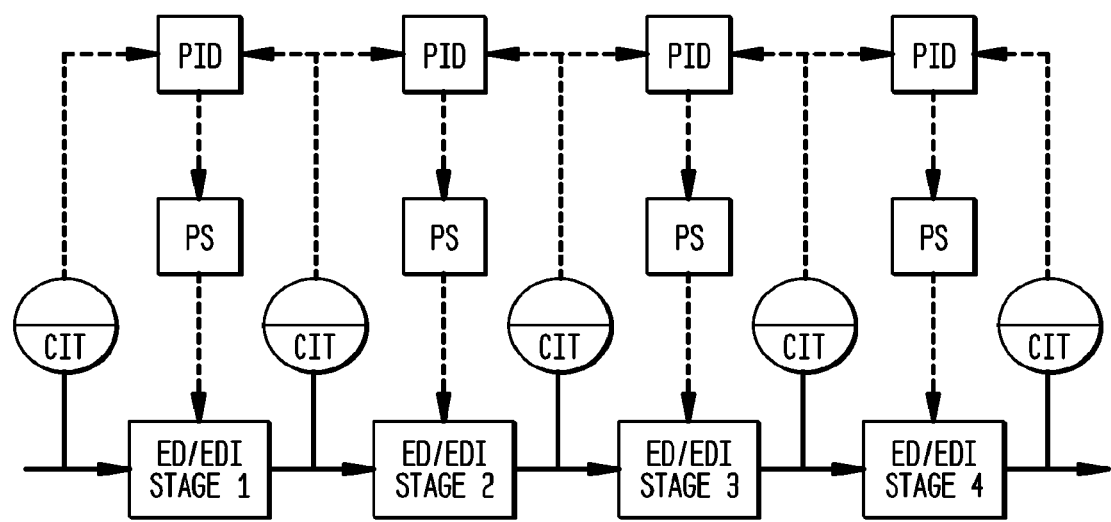

In accordance with one or more embodiments, the power consumption and the concentration polarization of the electrodesalination system comprising electrodialysis and electrodeionization modules may be reduced by applying different voltages to each stage of a multistage system. Water from the first stage may be transferred to the second stage and then to the third stage and beyond. A higher voltage and/or greater current density can be used in stages where the amount of ionic content in the water to be desalinated is greater and then decreased as the water becomes more pure such that later stages have a lower current density. In one non-limiting example, the current density on the first stage being fed with seawater may be about 23.1 A/m$^2$, the second stage may be about 17.8 A/m$^2$ and the third stage may be about 5.5 A/m$^2$. In some embodiments, the inlet and outlet conductivity may be measured with a conductivity sensor for each electrodialysis stage. Select voltages may then be applied so that concentration polarization does not occur. In another embodiment, a proportional-integral-derivative (PID) control as shown in FIG. 1 may be used to control the operation of each stage in a multi-stage electrodialysis/electrodeionization desalination process. The PID controller may use feedback, for instance the inlet and outlet conductivity from each stage, and calculate an error from a set point of the desired output of the stage compared to the actual reading. FIG. 2 illustrates a PID controller in accordance with one or more embodiments. Table 1 presents a non-limiting example of a control simulation.

TABLE 1

| FEED WATER QUALITY (ppm) | STAGE 1 RE-MOVAL (%) | CUR-RENT RE-QUIRED (A) | STAGE 1 PROD-UCT (ppm) | STAGE 2 RE-MOVAL (%) | CUR-RENT RE-QUIRED (A) | STAGE 2 PROD-UCT (ppm) | STAGE 3 RE-MOVAL (%) | CUR-RENT RE-QUIRED (A) | STAGE 3 PROD-UCT (ppm) | STAGE 4 RE-MOVAL (%) | CUR-RENT RE-QUIRED (A) | STAGE 4 PROD-UCT (ppm) |
|---|---|---|---|---|---|---|---|---|---|---|---|---|
| 35000 | 50 | 4.5 | 17500 | 50 | 2.3 | 8750 | 50 | 1.1 | 4375 | 44 | 1.0 | 500 |
| 25000 | 50 | 3.3 | 12500 | 50 | 1.6 | 5250 | 50 | 0.8 | 3125 | 42 | 0.1 | 500 |
| 10000 | 50 | 1.3 | 5000 | 50 | 0.7 | 2500 | 50 | 0.3 | 1250 | 39 | 0.2 | 500 |

In accordance with one or more embodiments, the PID controller may adjust the applied voltage to minimize the error between the set point and actual output conductivity from each stage. The flow rate may also be adjusted. The PID control may compensate for changes in the inlet conductivity which helps minimize concentration polarization. In some embodiments, a PID control may be set with gain parameters for the proportional, integral and derivate functions along with a conductivity set point for each stage, for instance 25 mS/cm for Stage 1. During operation, seawater may be fed to the first stage and the PID controller may adjust the applied voltage of the first stage so that an outlet conductivity near the set point is obtained. This may maximize efficiency in each stage which may help to minimize the overall power consumption of the desalination process while reducing the concentration polarization. In a further embodiment, a pH sensor may be used on the inlet and outlet of the electrodeionization or electrodialysis module either on the dilute and/or concentrate stream to detect a pH shift due to water splitting or water dissociation caused by concentration polarization. The applied voltage or flow rate can be adjusted to control the pH and thus minimize concentration polarization. A PID controller can be used to control the pH. This may help to maximize the efficiency and minimize the power consumption of the electrodesalination system.

In another embodiment, the water recovery may be adjusted on each stage to impact the power consumption. The salt concentration across an ion exchange membrane may generate a Donnan voltage. This voltage, also referred to as the thermodynamic voltage, can be thought of as the minimum voltage needed to electrically drive ions from the dilute compartment to the concentrate compartment. The Nernst equation may be used to calculate the Donnan voltage.

In accordance with one or more embodiments, variable water recovery may be applied to different ED stages. During desalination process, the later desalting stage can be operated at lower water recovery to minimize the concentration difference, or Donnan potential, between the dilute and concentrated streams. Higher recovery may widen the Donnan potential gap. Conversely, the early desalting stages can be operated at higher water recovery since the concentration difference is not as high.

The recovery rate of an ED can be described as:

$$\Delta = \frac{Q_{prac}^p}{Q_{prac}^f}$$

Here $\Delta$ is the recovery rate, $Q_{prac}^p$ the actual flow rate of the product and $Q_{prac}^f$ the actual total flow rate of the dilute and concentrate streams. When ignoring the water migration due to osmosis and electroosmosis between the dilute and concentrate streams, the recovery rate can be calculated as:

$$\Delta = \frac{Q^{dilute}}{Q^{dilute} + Q^{concen}}$$

Here $Q^{dilute}$ and $Q^{concen}$ are the flow rates of dilute feed and concentrated feed, respectively.

In conventional ED, a constant recovery rate is applied to the all stages of the entire desalting process. At the later stages of this operation, the concentrated stream becomes more concentrated and the dilute stream becomes more dilute. Thus a high concentration gradient is generated between the two streams, that is, a high Donnan potential exists. The Donnan potential can be simply calculated as:

$$\varphi_{Don} = \frac{RT}{z_i F} \ln \frac{C^{concen}}{C^{dilute}}$$

Here $C^{concen}$ and $C^{dilute}$ are the concentrations of the concentrate and dilute streams, respectively. The high Donnan potential means that more electric energy has to be applied to the ED system to overcome the high concentration gradient.

Typically, the dilute water from the first stage may be directed to the diluting compartments of the second stage and then to the third stage and beyond. If the concentrate water is also transferred from one stage to the other, the difference in concentration between the dilute and concentrate compartment may increase which results in an increasing amount of voltage needed for ion removal from the dilute compartment to the concentrate compartment. In order to counteract this effect, fresh seawater may be introduced into the second stage or subsequent stage concentrate compartments.

In an electrodesalination system with a plurality of stages, typically electrodialysis modules are used towards the seawater inlet and electrodeionization modules are used later in the process after the water has been partially purified. The ion exchange resin contained in the electrodeionization module helps to reduce the applied voltage when the water is low in conductivity. If an electrodeionization module is used on seawater, the impact of the ion exchange resin in the dilute compartment is small. Conversely, if the water in an electrodialysis module is too pure, a high electrical resistance will result which contributes to excess power consumption.

In accordance with one or more embodiments, the transition point between the use of electrodialysis and electrodeionization may be strategically determined and implemented. In accordance with one or more embodiments, the optimum transition point between ED and CEDI in the desalination process may depend primarily on voltage drop. The factors contributing to the voltage drop in an ED/CEDI cell include the conductivity of the cell and the thickness of the cell. CEDI adds conductive media to the cell to increase the overall cell conductivity. There could be, however, limits to minimizing the thickness of a cell containing conductive media. In this case, the optimum transition point from ED to CEDI depends heavily on the thickness of the two cells. For two given thicknesses (with an ED cell typically thinner than a CEDI cell), the optimum transition point will occur when the conductivity of the solution decreases enough that the ED cell becomes less conductive than the thicker CEDI cell. In some non-limiting embodiments, the transition point may be in a range of about 2000 to about 5000 mg/L. In some embodiments, the transition point may be in a range of about 2500 and 3500 mg/L. In still other embodiments, the transition point may be in a range of about 2500 and 3000 mg/L. In some specific non-limiting embodiments, the transition point may be about 2800 ppm.

In accordance with one or more embodiments of electrodialysis or electrodeionization modules, many cell pairs are bounded by a set of electrodes including an anode and cathode. The cathode material may comprise 316L stainless steel, Hastelloy C, or other materials that are resistant to corrosion. The anode material can comprise a base metal such as Titanium coated with a noble metal such as Platinum or a rare earth oxide such as Iridium or Ruthenium Oxide or combination thereof. A liquid may be used to flush the electrode compartments in order to remove gases and chemicals that are generated. In some embodiments, the liquid used in the electrode compartments to minimize the voltage drop may be modified to reduce the power consumption. One method of reducing the voltage drop in the electrode compartments is to use a liquid with a very high conductivity. Many concentrated salt solutions can be used such as sodium chloride or sodium sulfate. This liquid can comprise concentrated seawater for instance. In another embodiment, strong acids and bases may be used to flush the electrode compartments. In some embodiments, if the cathode compartment is flushed with a hydrochloric acid solution of between a pH of 0.5 to 2, the voltage drop may be minimized compared to the use of other liquids. In at least some embodiments, the anode compartment may be flushed with either concentrated seawater or sodium hydroxide or hydrochloric acid.

The concentration difference between the dilute and concentrated streams (Donnan potential) increases during desalination, and the energy required to overcome the concentration difference also increases as a result. In accordance with one or more embodiments, a multiple dumping strategy for the concentration stream may reduce the energy for overcoming the Donnan potential.

In accordance with one or more embodiments, electrode solutions may be varied. Voltage loss in the electrode compartment is dependant on the type of electrolyte used. An ideal electrolyte should have low voltage loss and minimizes risk of scaling.

With respect to the cathode compartment, hydroxyl ions are generated during the reduction process. Scaling is a concern in the choice of catholyte. Hydrochloric acid is the preferred choice for catholyte because it has low voltage loss and it minimizes scaling risk. In some embodiments, low catholyte pH can be achieved via a feed-and-bleed mode in which the catholyte stream is connected in a re-circulating loop to an acid feed tank. The acid tank is controlled, for example, at pH 3. Hydrochloric acid may be dosed into the acid tank to maintain the pH level. The acid tank may be drained occasionally to prevent hardness ions saturation. In other embodiments, low catholyte pH can be achieved via direct injection of hydrochloric acid into the catholyte stream using raw seawater as a catholyte feed solution. The pH of the catholyte stream may be maintained, for example, at pH 3. This mode may allow operation without a bulky acid feed tank.

$$H_2O + e^- \rightarrow \tfrac{1}{2}H_2 + OH^-$$

With respect to the anode compartment, proton ions are generated during the oxidation process. Sodium hydroxide or hydrochloric acid as anolyte may result in the lowest voltage loss. However, for cost and safety reasons, raw seawater may be used in the anode compartment. The module reject stream (concentrated stream) can also be used without any operational issues. This will result in minor savings of pre-treated raw sea water.

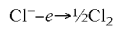

Figure 12:
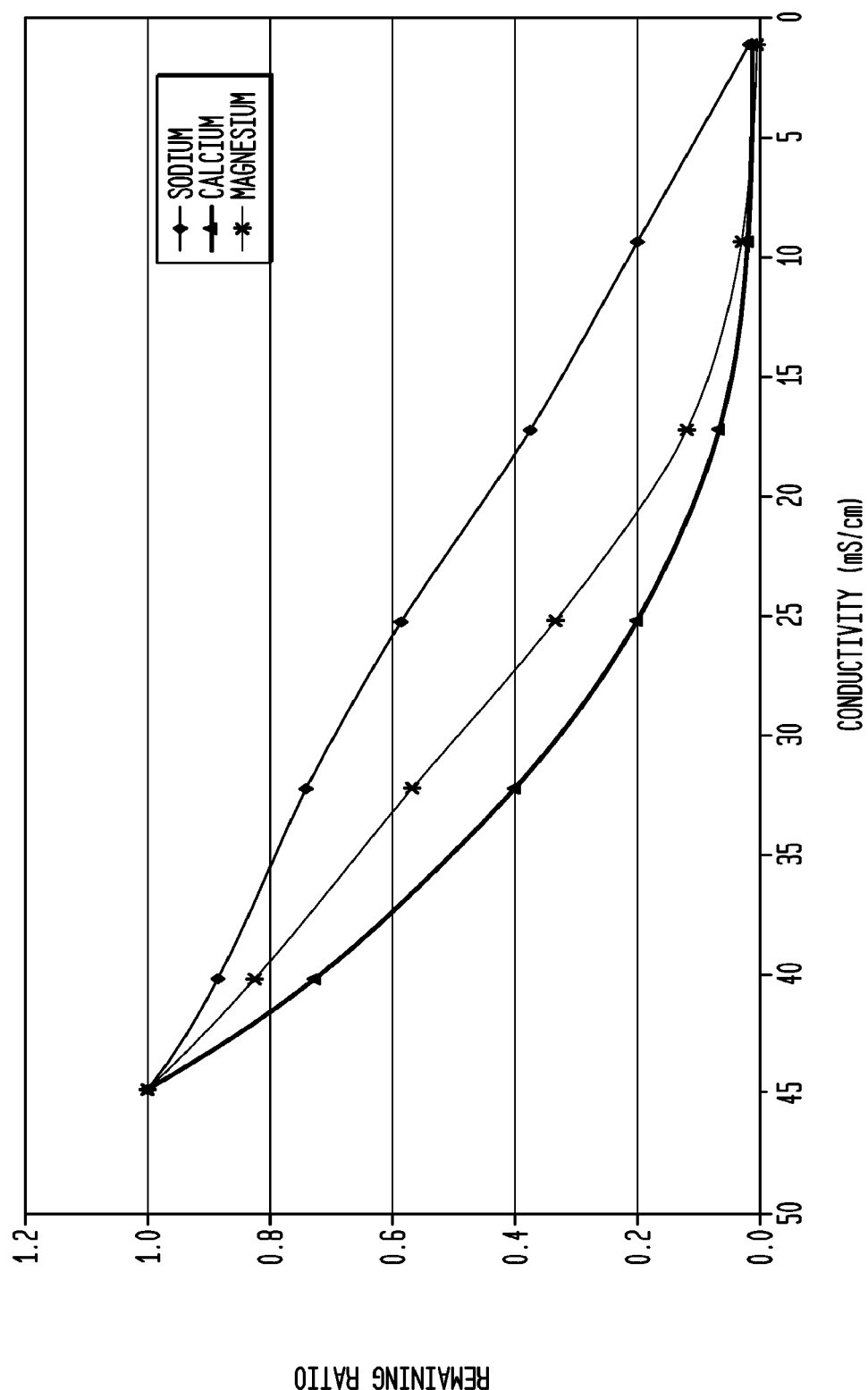
FIG. 12 presents an example of equilibrium data and related conductivity in accordance with one or more embodiments.

In accordance with one or more embodiments, ED stage-1 product water may be used as both catholyte and anolyte. Because most of the hardness will be removed early during the ED desalting process, the product water from stage-1 will contain low hardness. This stream can be first directed to the anode compartment, which will produce an acidic anode outlet. Subsequently, the product of the anode may be directed to the cathode compartment. HCl acid may be injected to maintain the pH of the cathode stream at a level less than 3. This may reduce the acid consumption for the cathode compartment. FIG. 12 presents an example of the ratio of remaining sodium, calcium and magnesium as a function of conductivity.

In other embodiments, the electrochemical deionization device can comprise a capacitive deionization device. This device uses a plurality of electrodes situated in parallel. A voltage of, for example, approximately 1.2 may be applied to the electrodes while water is passed between the electrodes. Ionic material is attracted to the electrode surface resulting in an effluent with reduced ionic content. Once the electrode pores or surface is saturated with ions, the polarity of the electrodes is reversed and the water diverted to drain. This is a batch type process as opposed to a continuous process. Capacitive deionization can be used either in conjunction with other types of electrochemical deionization devices or alone in an electrodesalination system.

In accordance with one or more embodiments, pretreatment, disinfection and/or cleaning in place (CIP) may be implemented in desalination processes. In some embodiments, sodium hypochlorite may be used as disinfectant. A potential dosing point is at the ED feed tank. In some non-limiting embodiments, the estimated contact time may be more than 10 sec before feed to ED module. The tank chlorine residual may be set, for example, as 0.5 ppm, or ORP reading over 650 mV.

In some embodiments, when raw seawater, ED stage-1 product or ED concentrate is used as the electrode stream, the anode reaction may generate chlorine gas. The anode stream outlet (with the chlorine gas) may be channeled to the feed tank as a source of disinfectant. Strategic use of analyte may eliminate the need for sodium hypochlorite in whole or in part.

In accordance with one or more embodiments, CIP may be implemented to control bacteria fouling. In one procedure, sodium hypochlorite and hydrochloric acid may be added to raw seawater. A cleaning solution may be prepared with residual free chlorine at 20 ppm. The pH level of the cleaning solution may be maintained at about 6 with the addition of hydrochloric acid. This may prevent the cleaning solution from becoming alkaline after addition of sodium hypochlorite. An alkaline cleaning solution will result in lower chlorine disinfection efficacy and precipitation of metals. The cleaning solution may be recirculated at a velocity of about 2 cm/s for a duration of about 20 mins. The ED device may then be flushed with seawater for about 10 mins before the ED device is returned to service.

In accordance with one or more embodiments, CIP may be implemented to control hardness scaling. In one example procedure, hydrochloric acid may be added to raw seawater. A cleaning solution may be prepared with the addition of hydrochloric acid to a pH set-point of about 2. Acid may be injected when required to maintain the pH level. The cleaning solution may be recirculated at a velocity of about 2 cm/s for a duration of about 20 mins. The ED device may then be flushed with seawater until the outlet pH level is greater than about 6 before the ED device is returned to service.

In accordance with one or more non-limiting embodiments, an overall treatment process may include disk filter treatment followed by ultrafiltration, followed by electrochemical desalination, followed by post-treatment operations.

Purified water may be sent for use or storage as potable water. Potable water may be preserved or further disinfected, if desired, and may find use in various applications including agriculture and industry, such as for semiconductor fabrication. A reject or concentrate stream produced by the electrochemical device may be collected and discharged to waste, recycled through the system, or fed to a downstream unit operation for further treatment. Product streams may be further processed prior to downstream use, upstream use, or disposal. For example, a pH level of a product acid or product base stream may be adjusted. In some embodiments, it may be desirable to mix, in part or in whole, one or more product streams. One or more additional unit operations may be fluidly connected downstream of the electrochemical unit. For example, one or more unit operations may be configured to receive and process a target product stream, such as before delivering it to a point of use. Polishing units, such as those involving chemical or biological treatment, may also be present to treat a product or effluent stream of the device prior to use or discharge.

In accordance with one or more embodiments, one or more sensors may be positioned to detect one or more characteristics, conditions, properties or states of any stream, component or subsystem generally associated with the device. In some non-limiting embodiments, one or more of the sensors may be configured to detect a concentration of a target species in a stream entering or exiting the device. In one embodiment, one or more sensors may be positioned to detect a concentration at an inlet and/or an outlet of one or more compartments of the device. In another non-limiting embodiment, one or more sensors may be positioned to detect a pH level at an inlet and/or an outlet of one or more compartments of the device. In still other embodiments, a pressure sensor may be associated with one or more compartments of the device. In yet other embodiments, sensors for detecting TDS may be implemented.

In some embodiments, devices and methods involve a controller for adjusting or regulating at least one operating parameter of the device or a component of the system, such as, but not limited to, actuating valves and pumps, as well as adjusting a property or characteristic of a current or an applied electric field through the electrically driven separation device. The controller may be in electronic communication with at least one sensor configured to detect at least one operational parameter of the system. The controller may be generally configured to generate a control signal to adjust one or more operational parameters in response to a signal generated by a sensor. For example, the controller can be configured to receive a representation of a condition, property, or state of any stream, component or subsystem of the device, or from the device. The controller typically includes an algorithm that facilitates generation of at least one output signal which is typically based on one or more of any of the representation and a target or desired value such as a set point. In accordance with one or more particular aspects of the invention, the controller can be configured to receive a representation of any of a measured property of any stream from the device, and generate a control, drive or output signal to any of the treatment system components, including the device, to reduce any deviation of the measured property from a target value.

In accordance with one or more embodiments, a controller may be configured to reverse polarity of an electric current applied through the device. The controller may be in communication with one or more sensors configured to provide a measurement signal which is representative of a concentration of a target species in a stream associated with the device, for example, a product stream exiting a compartment of the device. In some embodiments, a conductivity level, pressure or concentration measurement may be detected by a sensor and communicated to the controller. The controller may be configured to generate a control signal in response a received measurement being above or exceeding a predetermined level. The control signal may reverse polarity of an electric current applied through the device so as to regenerate a membrane or media in a compartment therein. In some embodiments, the control signal may be sent to a power supply associated with the device based at least partially on the measurement signal.

In other configurations, the controller can be in open-loop control, providing or changing one or more operating conditions of at least one component of the treatment system. For example, the controller can periodically generate output or drive signals, typically according to a predefined schedule, that reverses the polarity of the applied electric field, and preferably, the stream flow paths through the device, from a predetermined arrangement to a second predetermined arrangement.

One or more sensors implementable in the systems and methods can provide a representation of a property or characteristic of a stream into, from, or within the device, or a property or characteristic of a current applied through the device. For example, the one or more sensors can be configured to measure and provide a representation, e.g., a measured signal, of a process condition such as the pH of any stream exiting any of the compartments. The one or more sensors can also provide measured conductivity or resistivity values of any of the streams into, from or within the device. In particularly advantageous configurations, at least one sensor can be utilized to provide a representation, by direct measurement or by proxy, of the concentration of at least one target species in the product stream from the device, or from any of the compartments. Measurement of concentration can be effected by, for example, techniques wherein samples are batch-wise periodically retrieved and analyzed, or analyzed semi-continually through one or more side streams.

Prior to treatment of feed water in the electrochemical device, a variety of pretreatment procedures can be employed. For example, pretreatment techniques may be utilized on a feed water that may contain solids or other materials that may interfere with or reduce the efficiency of any stage or device, such as by scaling or fouling. An optional initial treatment may be provided to remove at least a portion of suspended solids, colloidal substances and/or solutes of elevated molecular weight. Pretreatment processes may be performed upstream of the EDI device and may include, for example, particulate filtration, sand filtration, carbon filtration, ultrafiltration, nanofiltration, microfiltration, such as cross-flow microfiltration, combinations thereof and other separation methods directed to the reduction of particulates. Adjustments to the pH and/or alkalinity of feed water may also be performed by, for example, the addition of an acid, base or buffer, or through aeration. Electrochemical separation may follow any pretreatment operation to provide water having a desired final purity.

The electrochemical devices may be operated in any suitable fashion that achieves the desired product and/or effects the desired treatment. For example, the various embodiments can be operated continuously, or essentially continuously or continually, intermittently, periodically, or even upon demand. Multi-pass systems may also be employed wherein feed is typically passed through the device two or more times, or may be passed through an optional second device. An electrical separation device may be operatively associated with one or more other units, assemblies, and/or components. Ancillary components and/or subsystems may include pipes, pumps, tanks, sensors, control systems, as well as power supply and distribution subsystems that cooperatively allow operation of the system.

It should be understood that the systems, techniques and methods may be used in connection with a wide variety of systems where the processing of one or more liquids may be desired. Thus, the electrical separation device may be modified by those of ordinary skill in the art as needed for a particular process, without departing from the scope of the invention.

The function and advantages of these and other embodiments will be more fully understood from the following non-limiting example. The example is intended to be illustrative in nature and is not to be considered as limiting the scope of the embodiments discussed herein.

PROPHETIC EXAMPLE

Seawater has a concentration of about 35,000 mg/l of total dissolved solids (TDS) or a conductivity of about 46 mS/cm. If the set point of the first stage is 25 mS/cm and the water recovery is about 50%, (calculated by the equation; % recovery=(dilute flow/dilute flow+concentrate flow)×100) the conductivity of the concentrate from the first stage will be about 67 mS/cm. If the water from the first stage dilute and concentrate is used to feed the dilute and concentrate streams respectively on the second stage, the Donnan voltage will be about 25.31 mV/cell pair. If, however, fresh seawater is used to feed the concentrate stream in the second stage, the Donnan voltage will be about 15.66 mV/cell pair, a 40% reduction. This is just one example of how varying the recovery and conductivity of the water used to feed the concentrate stream can affect the overall power consumption of the electrodesalination process. Many different combinations of feeding seawater to subsequent stage concentrate streams can be used to obtain the lowest possible Donnan voltage between the dilute and concentrate streams. Co-flow and counter-flow configurations and combinations are also possible.

Example 1

Experiments were conducted to determine where the transition point with respect to power consumption versus salt removal should be between the use of electrodialysis and electrodeionization. The transition point was determined to be between 2600 mg/l to about 5000 mg/l with the preferred transition point in the range of 3000 mg/l to 3500 mg/l. By using an electrodeionization module in the process train when the water is purified to this range, the power consumption of the process was minimized.

Example 2

Figure 5:
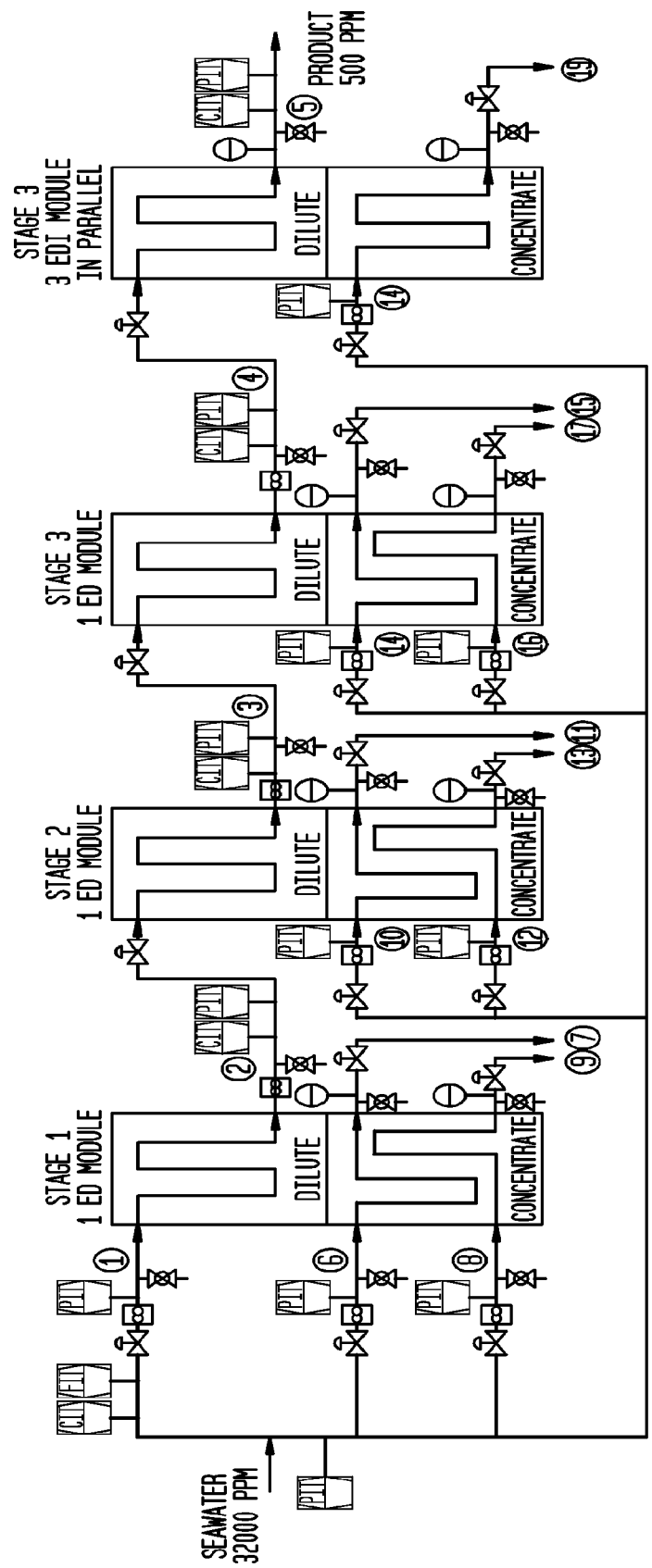
FIG. 5 presents a process diagram discussed in accompanying Example 2 in accordance with one or more embodiments.
Figure 6A:
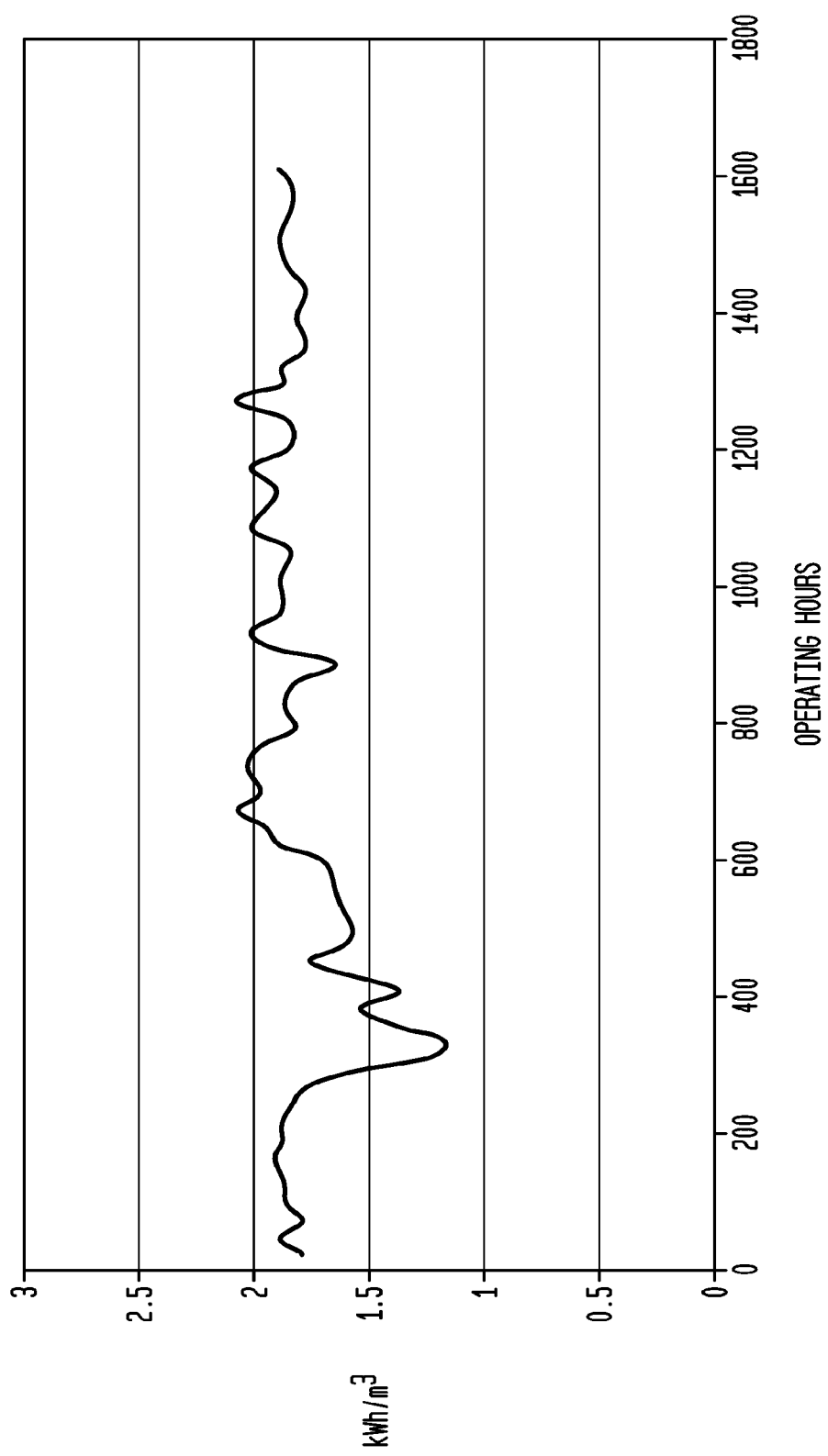
Figure 6B:
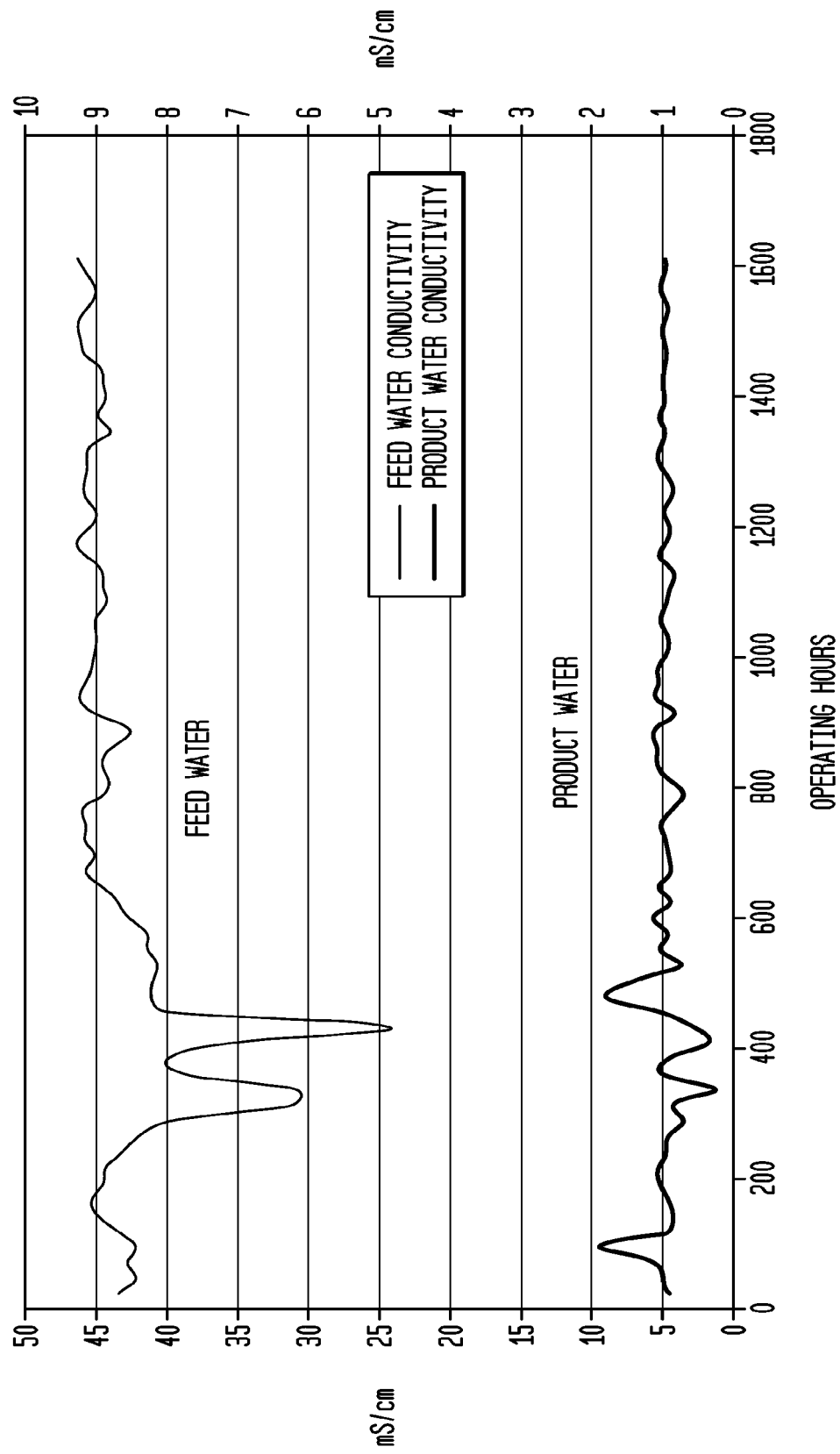
Figure 6D:
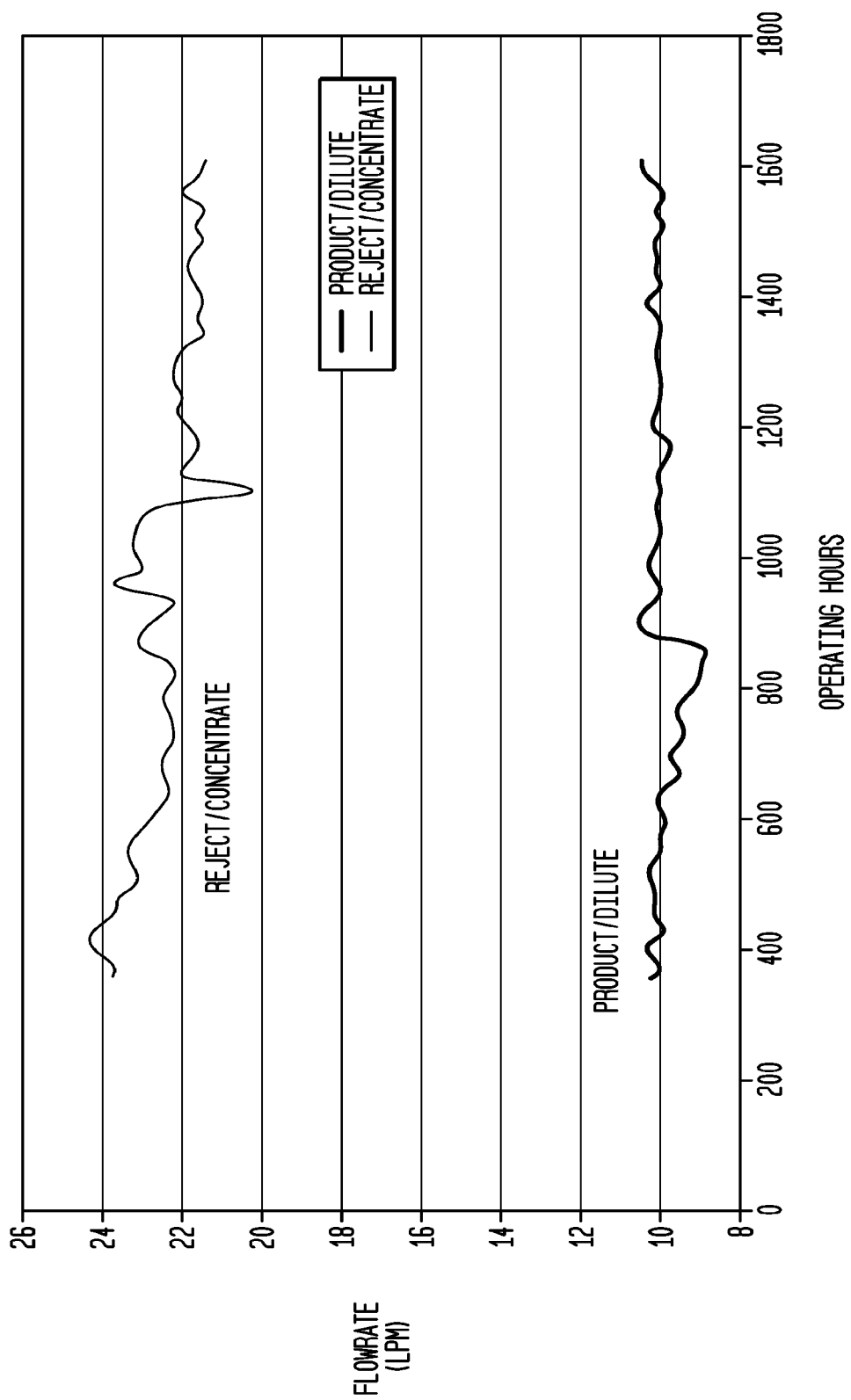

A four stage electrodesalination system comprising three stages of electrodialysis and one stage of electrodeionization was tested on natural seawater. The pretreatment consisted of sand or media filtration, chlorination, and cartridge depth filtration. The process diagram for the electrodesalination system is shown in FIG. 5. The ED dilute was provided in series flow and the ED concentrate was provided in parallel flow. Stages 1-3 each included an ED module. Stage 4 included three parallel EDI modules. Fresh seawater was used as concentrate feed for the concentrate for each stage. A PID control was used to control the voltage and current to each module independently by sensing the inlet and outlet conductivity of the dilute stream. The electrodialysis modules used for the first two stages utilized a three pass folded path configuration. The third electrodialysis stage used a five pass folded configuration. The electrodeionization module used a two pass folded path configuration. The inlet conductivity averaged about 46 mS/cm. The outlet conductivity was approximately 1 mS/cm or about 500 mg/l of TDS. The system operated for 1600 hours with an average power consumption of 1.8 kwh/m3 as shown in FIG. 6A illustrating power consumption as a function of time. The power consumption reflected the total of desalination power, pumping power, electrode losses and other inefficiencies. Conductivity data is presented in FIG. 6B. The average seawater conductivity was about 32,000 ppm TDS and the average product water conductivity was about 500 ppm TDS. Module resistance data is shown in FIG. 6C. Resistance was generally stable with fluctuations due to variation in product water quality and current setpoint. CEDI resistance was likely lower due to resins in dilute compartments. Flowrate data is presented in FIG. 6D. System flowrate was allowed to fluctuate, thus keeping the pressure drop constant. The total system pressure drop was about 1.5 bar. The overall recovery rate was about 30%. The performance of the electrodesalination process in terms of power consumption is substantially improved compared to other desalination technologies.

Example 3

Laboratory experiments indicated that about 5% energy savings is possible using variable water recovery in accordance with one or more embodiments.

A high recovery rate was applied during the initial phase of the desalting process and a low recovery rate was applied at the later stages. The goal was to maintain the lowest possible ratio of the stream concentrations between the concentrate and dilute compartments. This is beneficial to reducing the energy penalty caused by the Donnan effect.

Figure 3:
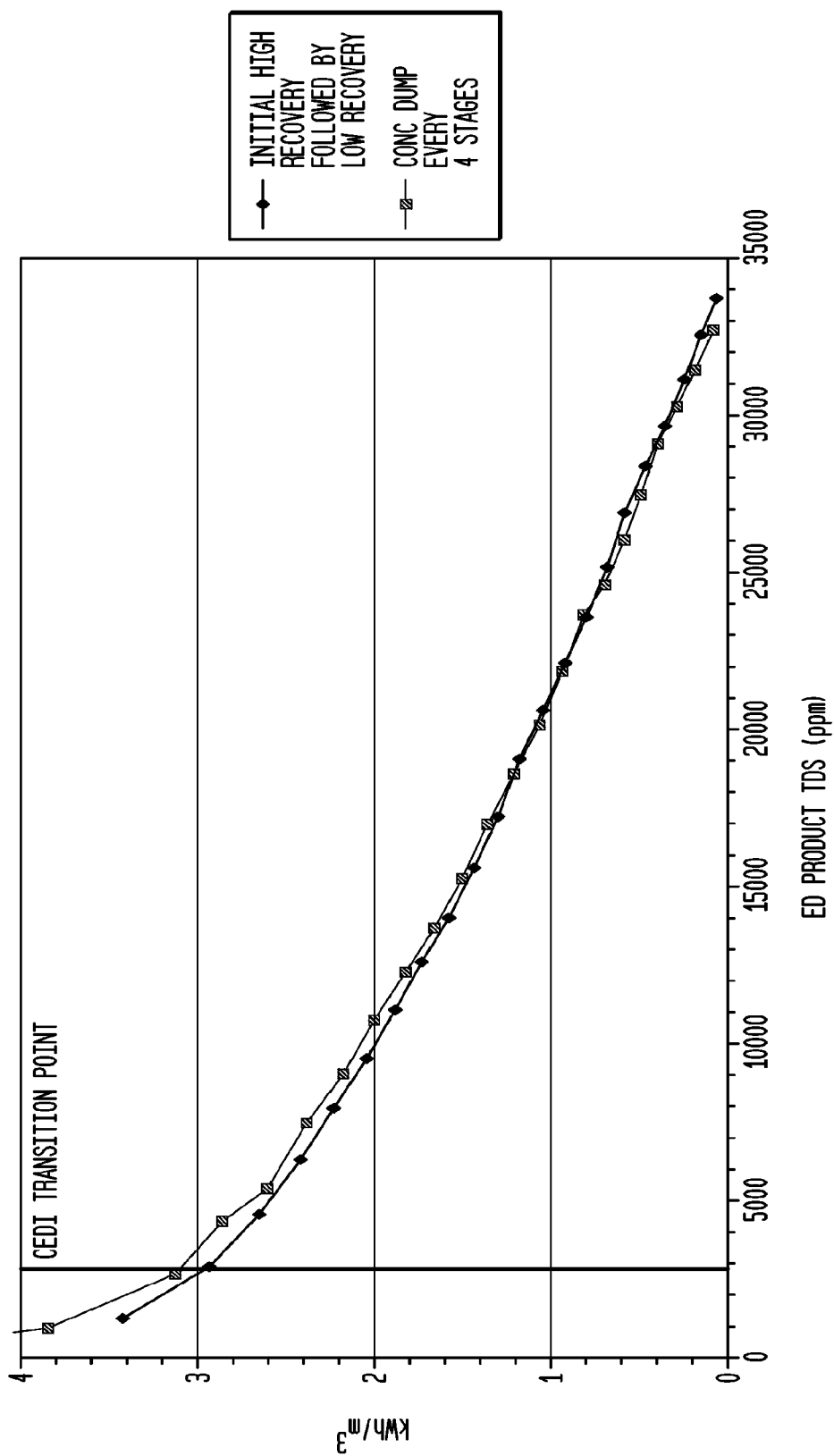
FIGS. 3-4 present data discussed in accompanying Example 3 in accordance with one or more embodiments.
Figure 4:
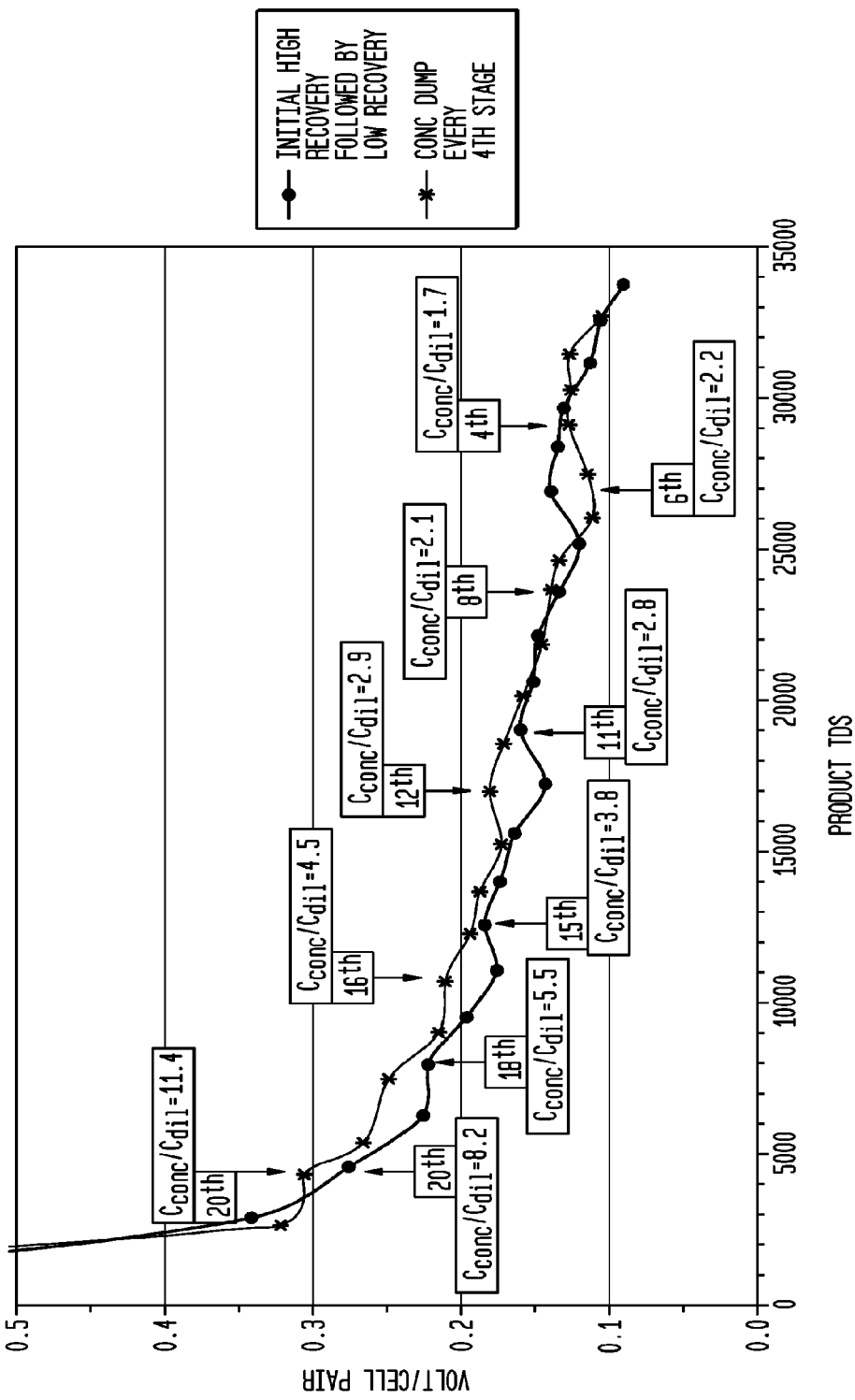

As shown in the laboratory experimental data, one method is to dump the concentrate stream at every 4th stage in the whole 21 stages. The other way is to dump the concentrate stream at 6th, 11th, 15th, 18th, 20th stages. For these two operations, the entire water recovery rate is the same. From the experiments, the second method benefits to keep a moderate concentration gradient between the streams (ratio 8.2 compared to 11.4 in the first method). This variable recovery rate operation can save about 5% energy in the desalting process. FIG. 3 illustrates the ED/CEDI transition point with variable recovery and data of energy consumption vs. ppm TDS in ED product. FIG. 4 illustrates variable recovery with fresh seawater and data of voltage drop per cell pair versus product TDS.

Example 4

Figure 7:
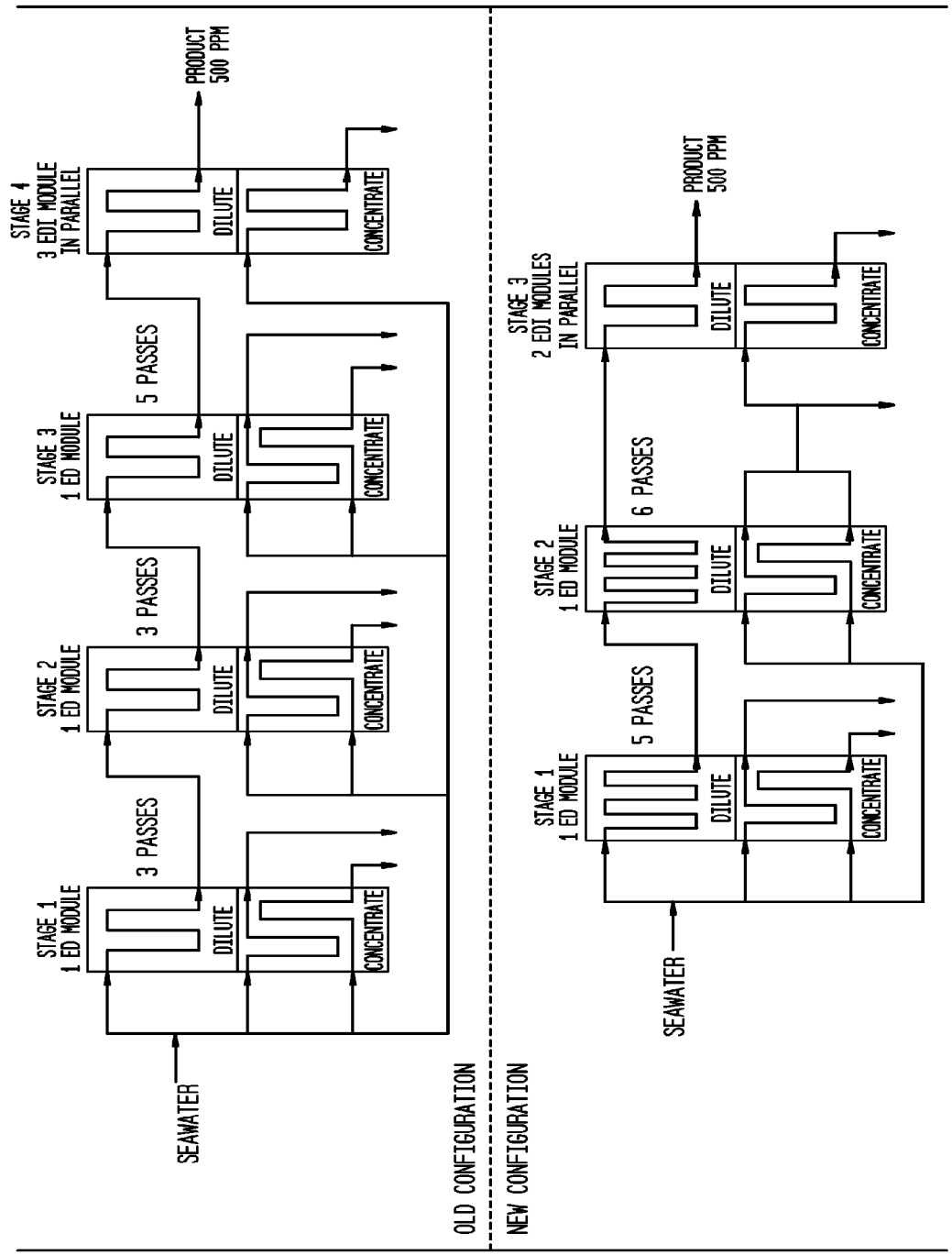
FIG. 7 presents a schematic of system configurations discussed in accompanying Example 4 in accordance with one or more embodiments.

An ED configuration was demonstrated with seawater using a velocity profile. FIG. 7 illustrates the old and new configurations. In the new configuration, an increased velocity was applied in Stage 2. Table 3 indicates the velocity profile of ED Stages 1 and 2 after reconfiguration.

TABLE 3

| ED-1 | | |
|---|---|---|
| PASS | CELL PAIRS PER PASS | NOMINAL VELOCITY (cm/sec) |
| 1 | 182 | 0.48 |
| 2 | 164 | 0.53 |
| 3 | 148 | 0.59 |
| 4 | 130 | 0.67 |
| 5 | 120 | 0.73 |
| ED-2 | | |
| PASS | CELL PAIRS PER PASS | NORMAL VELOCITY (cm/sec) |
| 1 | 170 | 0.48 |
| 2 | 150 | 0.54 |
| 3 | 140 | 0.58 |
| 4 | 120 | 0.67 |
| 5 | 80 | 1.01 |
| 6 | 60 | 1.35 |

Figure 8:
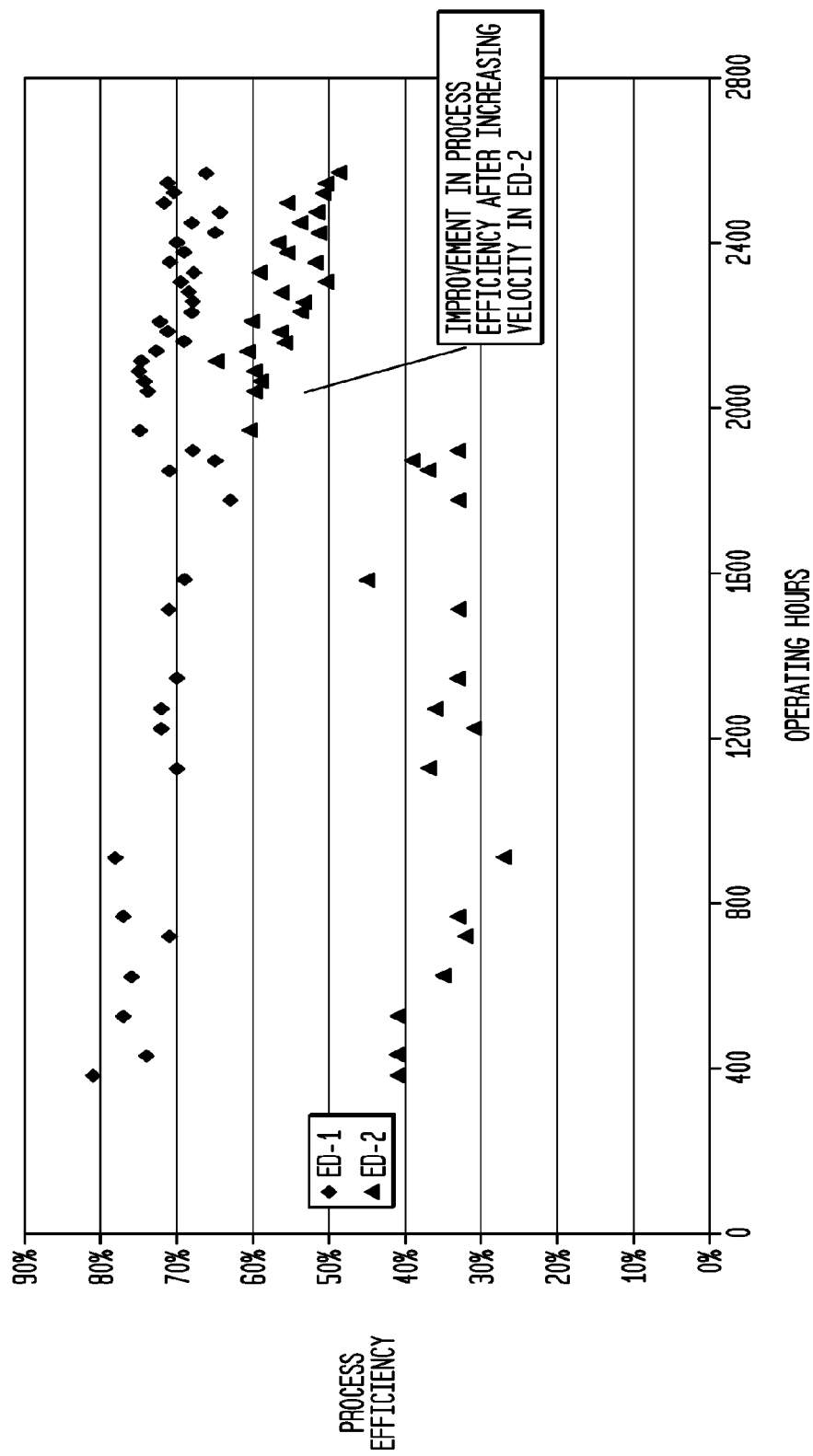
FIGS. 8-10 present data discussed in accompanying Example 4 in accordance with one or more embodiments.
Figure 9:
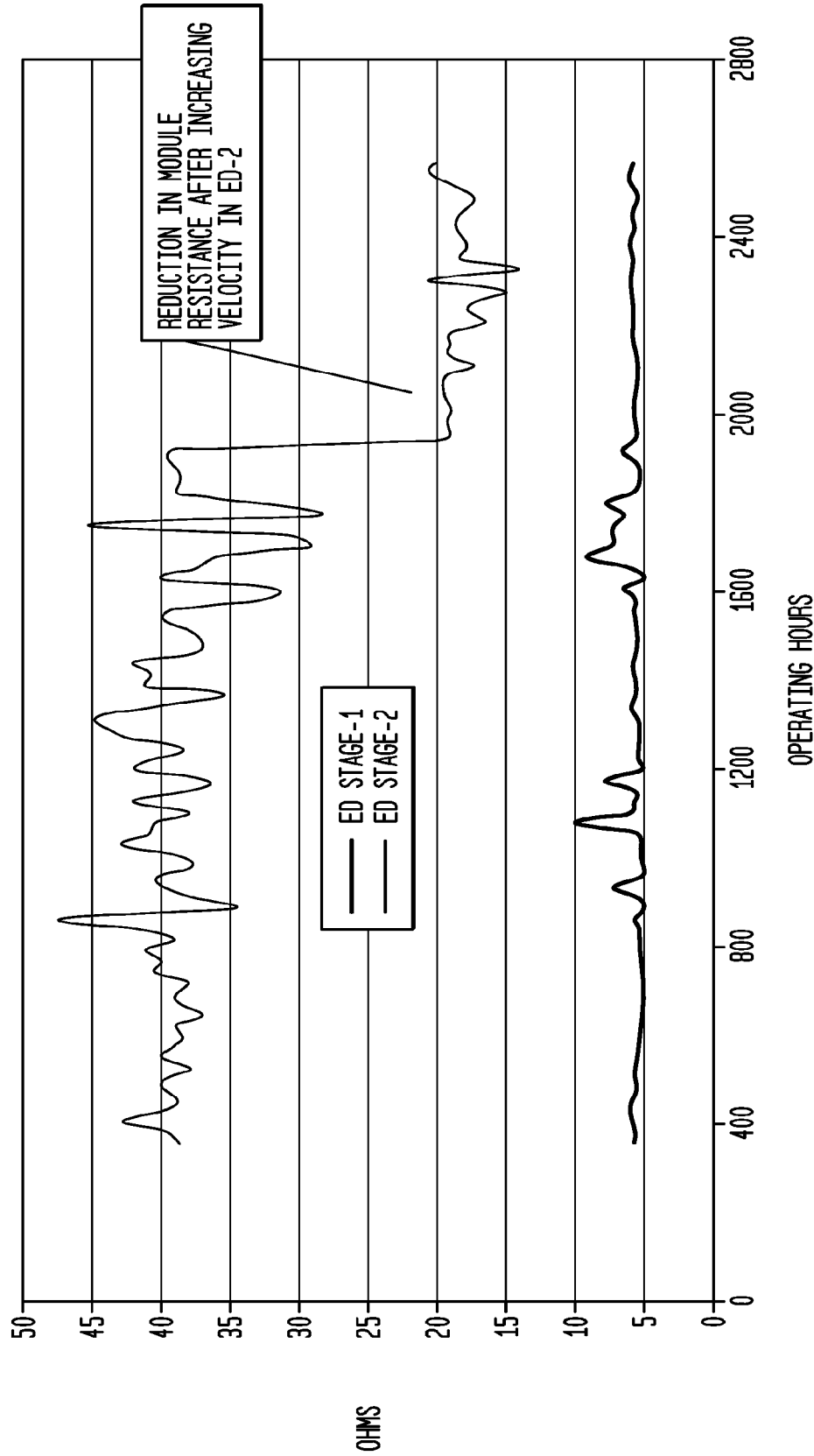
Figure 10:
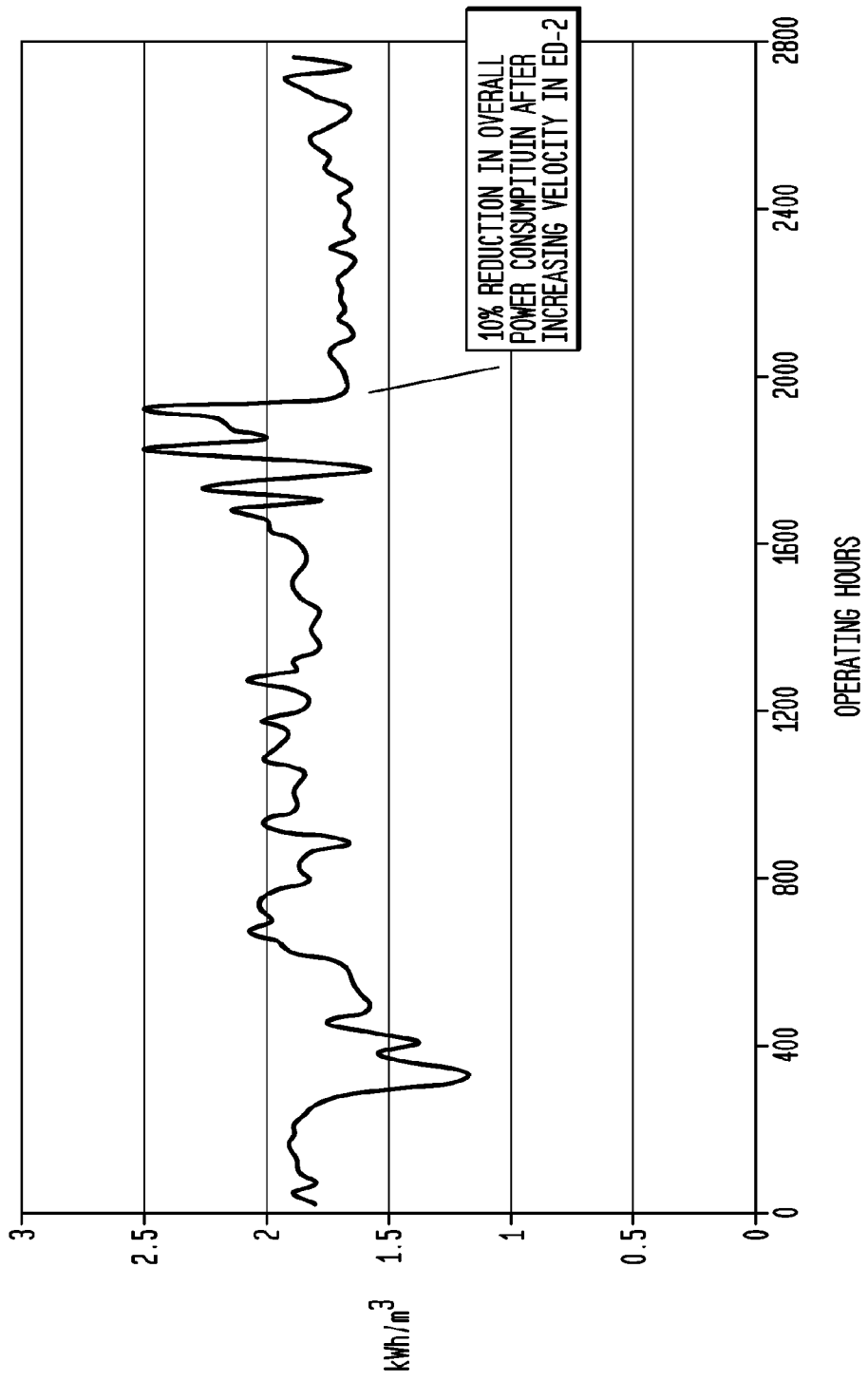

FIG. 8 illustrates improvement in process efficiency after increasing velocity in Stage 2. FIG. 9 illustrates a decrease in Stage 2 module resistance after increasing velocity in Stage 2. FIG. 10 illustrates a decrease in overall power consumption after increasing velocity in Stage 2.

Example 5

Multiple dumps on the concentrated stream was demonstrated. In desalination ED modules, the concentrated stream consisted of two dumps for each module, both parallel to the fresh seawater inlet.

The desalination energy consumption with different concentrated stream dumping was calculated as shown in Table 4 with the following assumptions: (1) desalinating 35000 ppm NaCl, 25° C., to product 500 ppm, (2) membrane area resistance 2.8 ohm-cm2, and current density 35 A/m2, (3) alpha parameter (reflecting compartment volume occupied by screen) 0.45, and beta parameter (reflecting membrane surface area occupied by screen) 0.70, (4) osmotic permeability 4.5 ml/(m2·hr·bar), and electroosmotic permeability 3.7 mol-Water per Faraday, (5) water recovery 40%, (6) ignoring current efficiency loss, (7) ignoring electrode voltage.

TABLE 4

| Dumping number | Energy (kWh/m3) |
|---|---|
| 1 | 2.2621 |
| 2 | 1.8332 |
| 4 | 1.6865 |
| 10 | 1.6203 |

Figure 11:
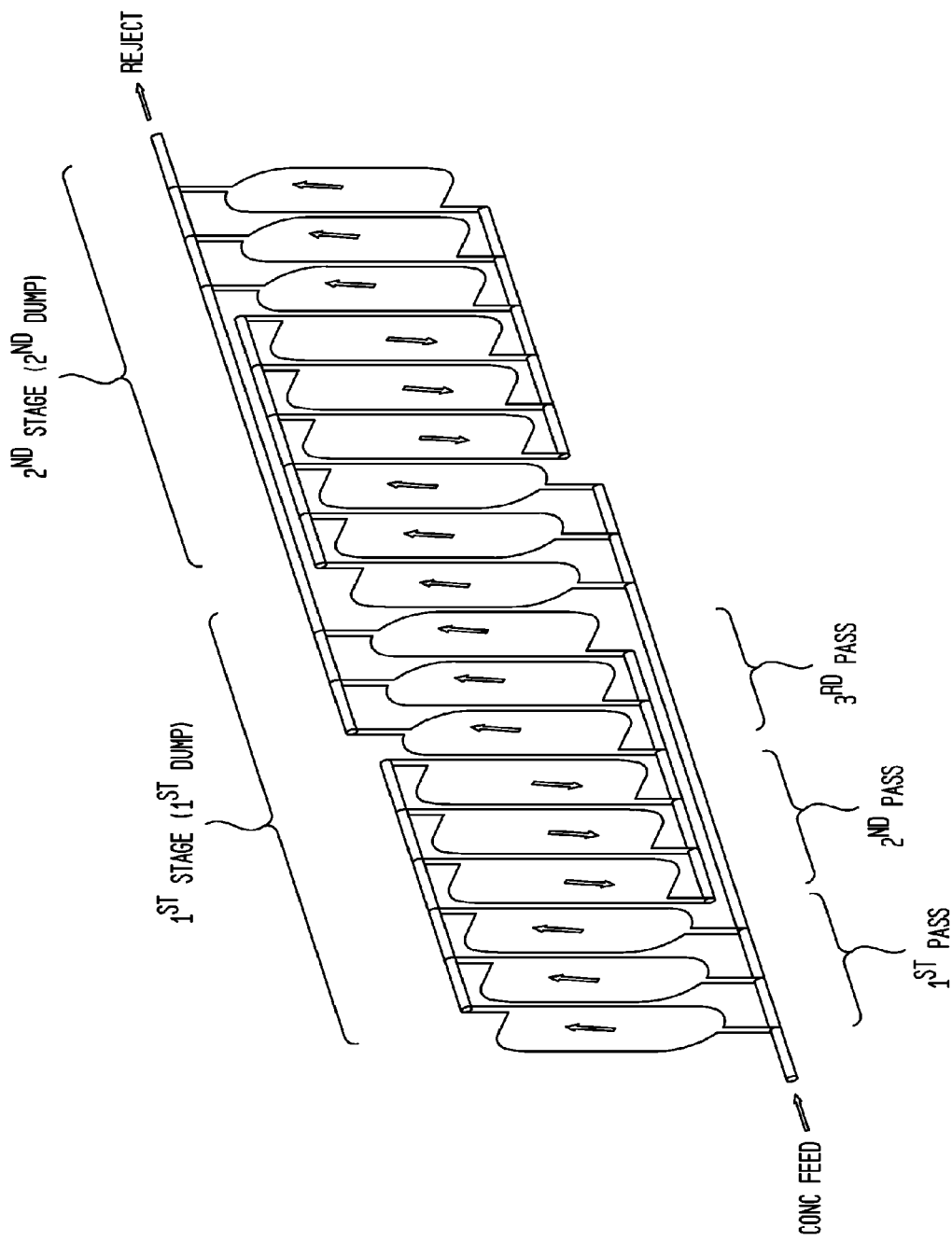
FIG. 11 presents a schematic of a spacer configuration discussed in accompanying Example 5 in accordance with one or more embodiments.

FIG. 11 illustrates the spacer configuration and method of multiple concentrate dumps/passes in an ED module.

Example 6

Figure 13:
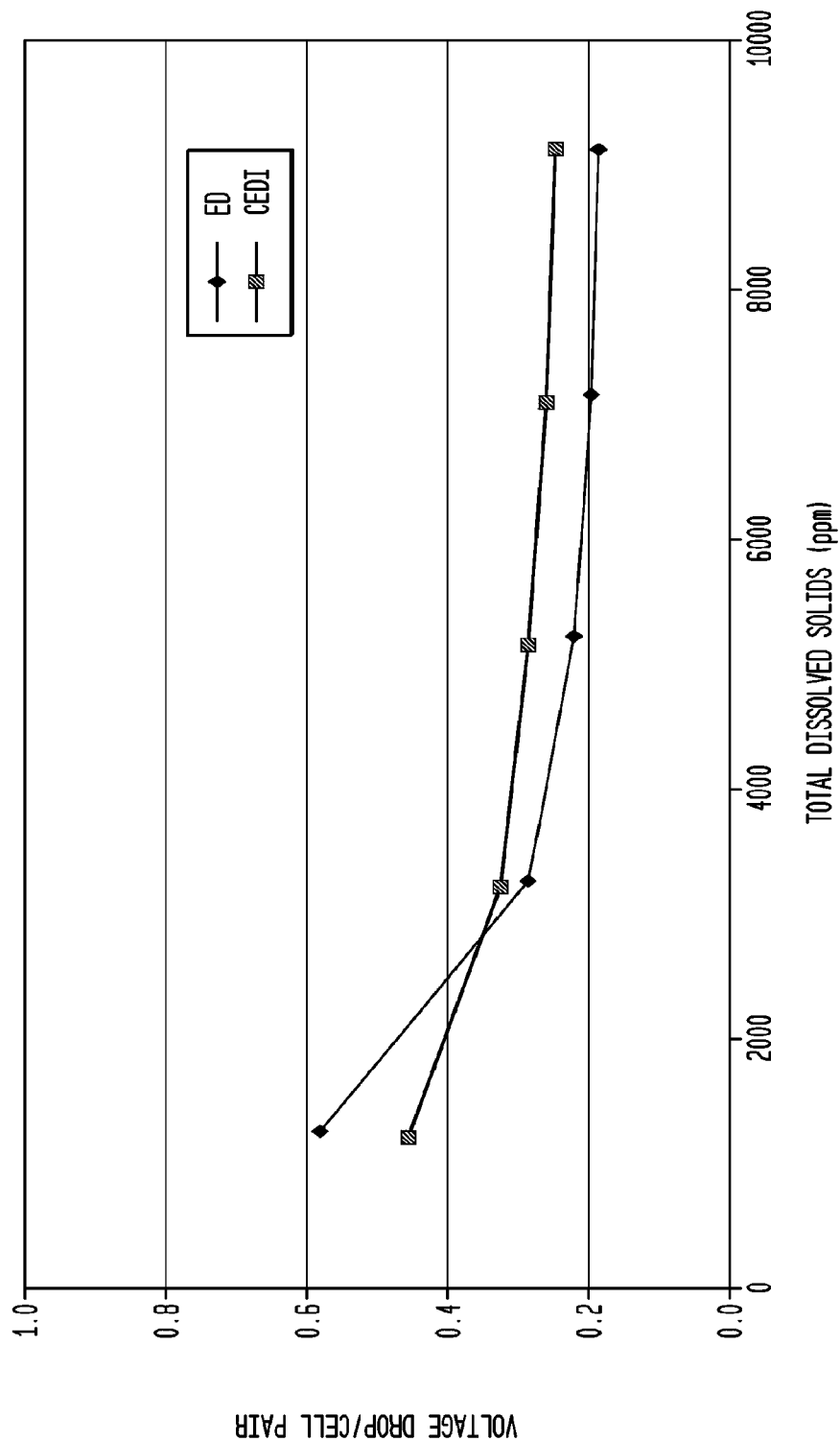
FIGS. 13-14 present data discussed in accompanying Example 6 in accordance with one or more embodiments.
Figure 14:
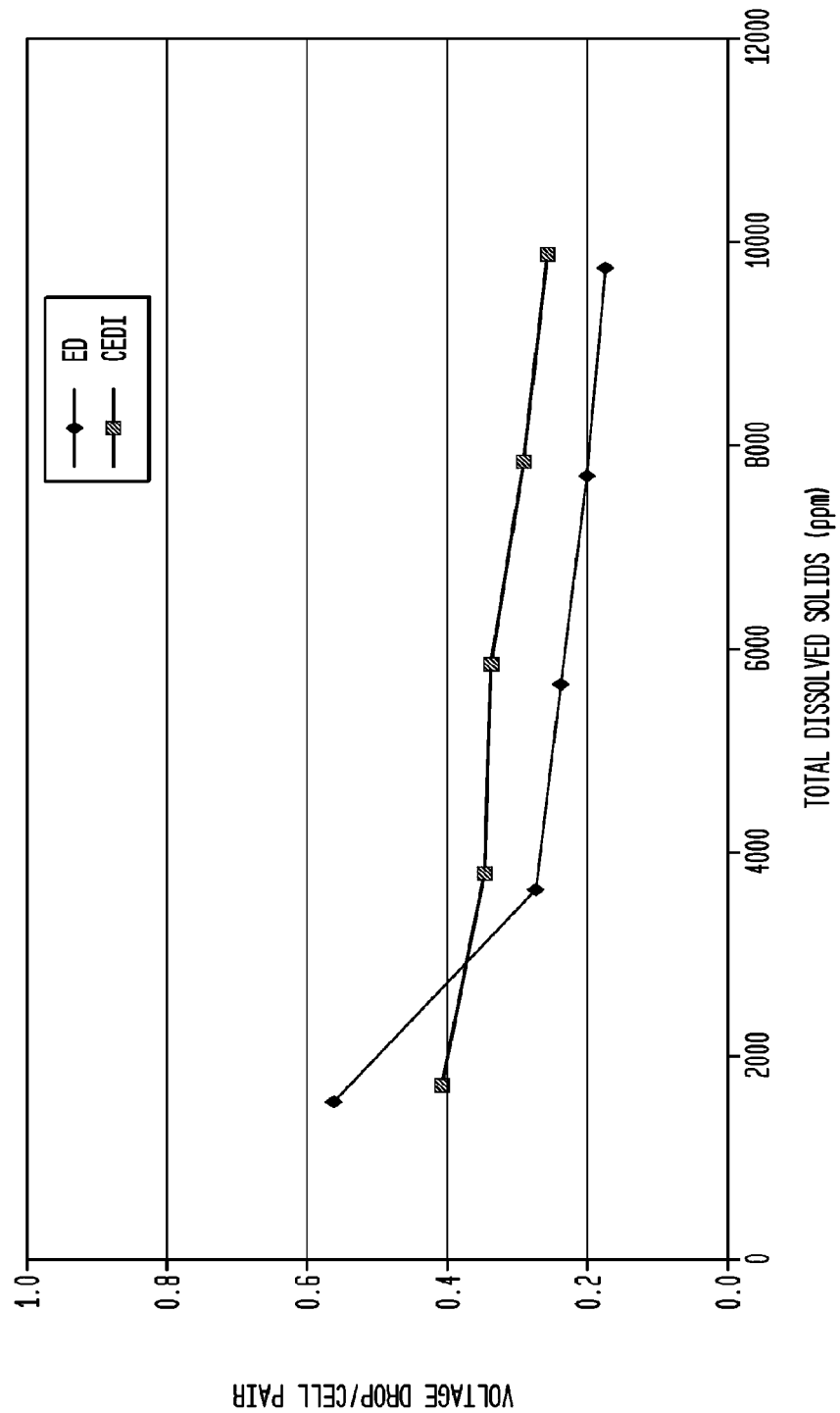

Experiments were conducted to establish the transition point for a given spacer thicknesses. Thicknesses were chosen to match the likely thicknesses to be used in a demonstration desalination plant. The experiments consisted of desalinating NaCl and synthetic seawater solutions with an ED module and a CEDI module. Voltage drop data was collected during each run and plotted for comparison. FIGS. 13 and 14 display the results. FIG. 13 presents ED. vs. EDI for NaCl desalination. FIG. 14 presents ED vs. CEDI for synthetic seawater desalination. For NaCl solutions, the optimum transition point for these thicknesses was shown to be about 2800 ppm TDS. For synthetic seawater solutions, the optimum transition point for these thicknesses was shown to be about 3000 ppm.

This transition point is subject to change with differing thicknesses and solution conductivities. For example, when testing with thinner ED spacers of 0.38 mm thickness, the optimum transition point moved to about 2600 ppm and this trend would likely continue as the thickness gap between ED and CEDI decreases. Also, depending on the ionic makeup of a given solution, the conductivity may be different for a given TDS. For example, seawater is less conductive than a NaCl solution for a given TDS. This likely explains the difference in transition point in the experiments.

Example 7

Figure 15:
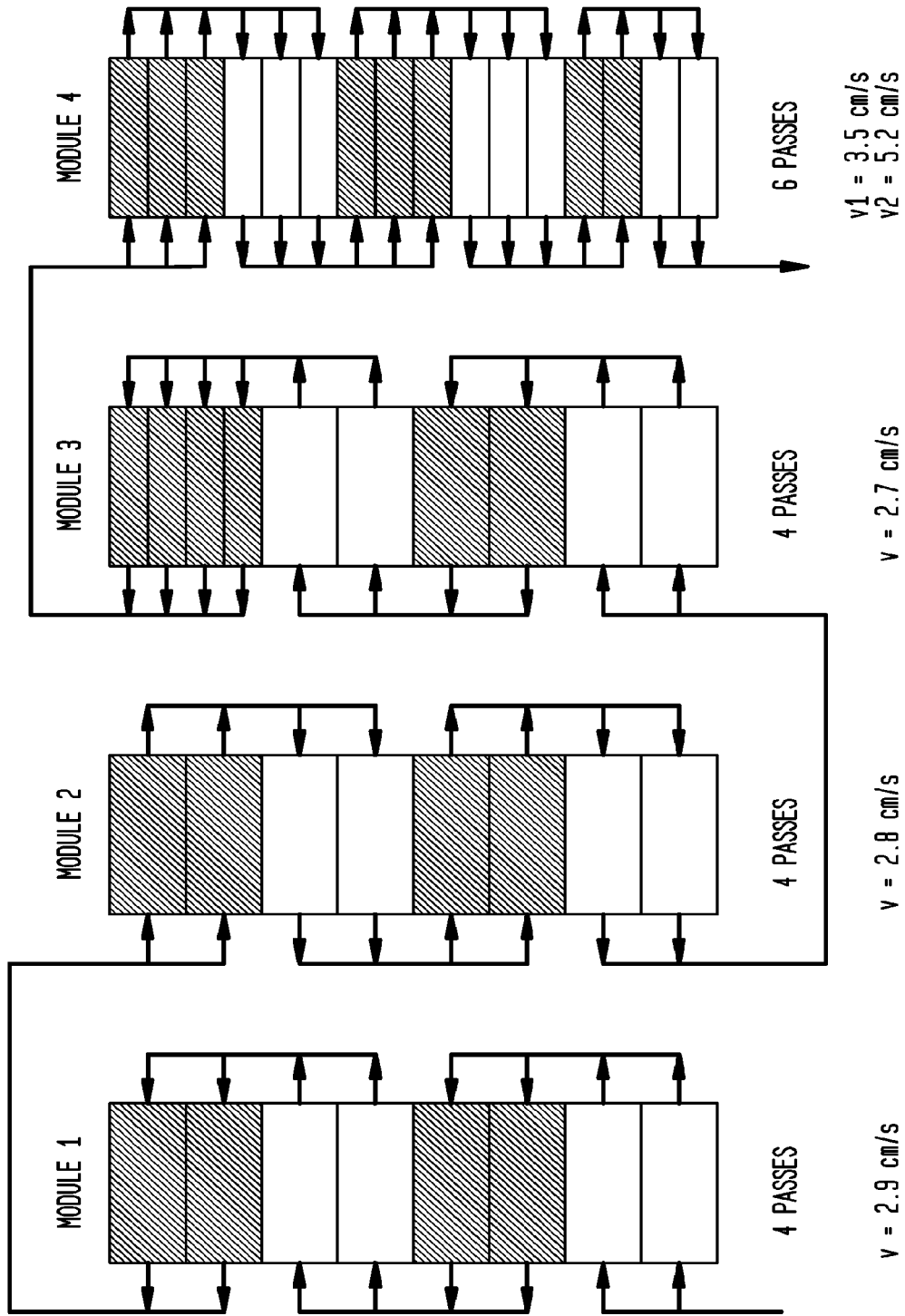
FIG. 15 presents a system schematic as discussed in accompanying Example 7 in accordance with one or more embodiments.

A four stage system as schematically presented in FIG. 15 was operated at the indicated velocities. Each module contained 2880 cell pairs. A 40% recovery at 2.0 kWh/m$^3$ was achieved. It was demonstrated that reduced flow rate yielded greater energy efficiency.

While exemplary embodiments of the disclosure have been disclosed many modifications, additions, and deletions may be made therein without departing from the spirit and scope of the disclosure and its equivalents, as set forth in the following claims.

Those skilled in the art would readily appreciate that the various parameters and configurations described herein are meant to be exemplary and that actual parameters and configurations will depend upon the specific application for which the electrical purification apparatus and methods of the present disclosure are used. Those skilled in the art will recognize, or be able to ascertain using no more than routine experimentation, many equivalents to the specific embodiments described herein. For example, those skilled in the art may recognize that the apparatus, and components thereof, according to the present disclosure may further comprise a network of systems or be a component of a water purification or treatment system. It is, therefore, to be understood that the foregoing embodiments are presented by way of example only and that, within the scope of the appended claims and equivalents thereto, the disclosed electrical purification apparatus and methods may be practiced otherwise than as specifically described. The present apparatus and methods are directed to each individual feature or method described herein. In addition, any combination of two or more such features, apparatus or methods, if such features, apparatus or methods are not mutually inconsistent, is included within the scope of the present disclosure.

For example, the housing may be of any suitable geometry such that one or more membrane cell stacks or modular units may be secured within. For example, the housing may be cylindrical, polygonal, square, or rectangular. With regard to the membrane cell stacks and modular units, any suitable geometry is acceptable so long as the cell stack or modular unit may be secured to the housing. For example the membranes or spacers may be rectangular in shape. In certain embodiments, a housing may not be required. The geometry of the membranes and spacers may be of any suitable geometry such that the membranes and spacers may be secured within a cell stack. In certain embodiments, the geometry of any of the housing, cell stack, membranes, and spacers may selected to accommodate operational parameters of the electrical purification apparatus. For example, the spacers may be asymmetrical to accommodate differences in flow rates between the dilute and concentrate streams.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, an existing facility may be modified to utilize or incorporate any one or more aspects of the disclosure. Thus, in some cases, the apparatus and methods may involve connecting or configuring an existing facility to comprise an electrical purification apparatus. Accordingly, the foregoing description and drawings are by way of example only. Further, the depictions in the drawings do not limit the disclosures to the particularly illustrated representations.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of providing potable water, comprising:
   fluidly connecting a seawater feed stream to an inlet of an electrical purification system, the system comprising at least a first stage and a second stage downstream of the first stage;
   recovering water from the first stage at a first rate;
   recovering water from the second stage at a second rate that is less than the first rate; and
   fluidly connecting an outlet of the electrical purification system to a potable point of use.

2. The method of claim 1, further comprising maintaining a target concentration gradient between concentrate and dilute compartments in each of the first and second stages.

3. The method of claim 2, further comprising performing multiple dumps of a concentrate stream associated with at least one stage of the electrical purification system.

4. The method of claim 1, further comprising adjusting a pH level of an electrolyte in the electrical purification system.

5. The method of claim 1, further comprising performing a disinfecting or cleaning-in-place operation on the electrical purification system.

6. The method of claim 1, wherein the electrical purification system comprises a capacitive deionization device.

* * * * *